US012332434B2

(12) United States Patent
Urey et al.

(10) Patent No.: US 12,332,434 B2
(45) Date of Patent: Jun. 17, 2025

(54) HOLOGRAPHIC HEAD-UP DISPLAY SYSTEM

(71) Applicant: CY VISION INC., San Jose, CA (US)

(72) Inventors: Hakan Urey, Istanbul (TR); Georgios Skolianos, Redwood City, CA (US); Erdem Ulusoy, Istanbul (TR); Goksen G. Yaralioglu, Los Altos, CA (US); Trevor Chan, San Jose, CA (US)

(73) Assignee: CY VISION INC., San Jose, CA (US)

( * ) Notice: Subject to any disclaimer, the term of this patent is extended or adjusted under 35 U.S.C. 154(b) by 972 days.

(21) Appl. No.: 17/401,127

(22) Filed: Aug. 12, 2021

(65) Prior Publication Data
US 2021/0373330 A1 Dec. 2, 2021

Related U.S. Application Data

(63) Continuation of application No. PCT/TR2019/050092, filed on Feb. 12, 2019.

(51) Int. Cl.
G02B 27/01 (2006.01)
G02B 25/00 (2006.01)
(Continued)

(52) U.S. Cl.
CPC ....... *G02B 27/0101* (2013.01); *G02B 25/001* (2013.01); *G02B 26/0816* (2013.01);
(Continued)

(58) Field of Classification Search
CPC .............. G02B 25/001; G02B 26/0816; G02B 27/0093; G02B 27/0101; G02B 27/0103;
(Continued)

(56) References Cited

U.S. PATENT DOCUMENTS 6,429,867 B1 * 8/2002 Deering ............... H04N 19/597
348/E13.058
8,339,695 B2 * 12/2012 Haussler ................ H04N 13/32
345/418
(Continued)

FOREIGN PATENT DOCUMENTS

DE 102011075884 11/2012
DE 102014217180 A1 * 3/2016 ......... G02B 27/0101
(Continued)

OTHER PUBLICATIONS

English machine translation of DE102014217180A1. (Year: 2024).*
(Continued)

Primary Examiner — Collin X Beatty
(74) Attorney, Agent, or Firm — Crowell & Moring LLP

(57) ABSTRACT

A device and a system includes a head-up display intended to be used to display projected images on surface such as an interior surface of a vehicle windshield. The device and system more particularly relates to a holographic head-up display device, a light module comprising a light source, together with a spatial light modulator displaying a computer-generated hologram once unmodulated beams are filtered using an optical filter. Said HUD device further comprises a head-tracking system for measurement of and adjustment according to interpupillary distance, a processor circuitry for said adjustment and processing pertaining thereto to be undertaken, as well as an optical steering apparatus.

25 Claims, 37 Drawing Sheets

(51) Int. Cl.
*G02B 26/08* (2006.01)
*G02B 27/00* (2006.01)

(52) U.S. Cl.
CPC ..... *G02B 27/0093* (2013.01); *G02B 27/0103* (2013.01); *G02B 2027/0134* (2013.01); *G02B 2027/014* (2013.01); *G02B 2027/0161* (2013.01)

(58) Field of Classification Search
CPC .............. G02B 30/33; G02B 2027/014; G02B 2027/0105; G02B 2027/0109; G02B 2027/0134; G02B 2027/0161; G03H 1/22; G03H 1/2294; B60K 35/00; B60K 35/23
USPC .................................................. 359/13; 345/7
See application file for complete search history.

(56) References Cited

U.S. PATENT DOCUMENTS

| | | | | |
|---|---|---|---|---|
| 9,400,384 | B2* | 7/2016 | Griffith | G02B 27/017 |
| 10,338,525 | B2* | 7/2019 | Sung | G02B 27/0103 |
| 10,499,021 | B2* | 12/2019 | Tardif | H04N 9/3185 |
| 10,514,658 | B2* | 12/2019 | Christmas | G02B 27/0103 |
| 10,591,738 | B2* | 3/2020 | Svarichevsky | G06F 3/011 |
| 10,782,522 | B2* | 9/2020 | Futterer | G02B 27/0037 |
| 11,442,269 | B2* | 9/2022 | Kusafuka | H04N 13/378 |
| 2010/0027083 | A1* | 2/2010 | Kroll | G03H 1/02 359/9 |
| 2016/0313556 | A1 | 10/2016 | Futterer | |
| 2018/0003962 | A1 | 1/2018 | Urey et al. | |
| 2018/0003981 | A1 | 1/2018 | Urey | |
| 2018/0045960 | A1* | 2/2018 | Palacios | G02F 1/1343 |
| 2019/0155033 | A1* | 5/2019 | Gelman | G02B 27/0093 |
| 2020/0049995 | A1* | 2/2020 | Urey | G02B 27/0179 |
| 2020/0353816 | A1* | 11/2020 | Hirata | G06V 20/59 |
| 2021/0107357 | A1* | 4/2021 | Yu | G02B 27/0101 |

FOREIGN PATENT DOCUMENTS

| | | |
|---|---|---|
| EP | 3146377 B1 | 3/2017 |
| GB | 2554575 B | 4/2018 |
| WO | WO 2016105285 A1 | 6/2016 |
| WO | WO-2017195026 A2 * | 11/2017 ............. B60K 35/00 |

OTHER PUBLICATIONS

Yasuhiro Takaki, Super multi-view and holographic displays using MEMS devices, Displays, vol. 37, 2015, pp. 19-24, (Year: 2015).*

Slinger, C.W. et al., Computer-generated holography as a generic display technology, in *Computer*, vol. 38, No. 8, pp. 46-53, Aug. 2005, doi: 10.1109/MC.2005.260.

Wang, W. et al., Digital Holographic System for Automotive Augmented Reality Head-Up-Display, 2018 IEEE 27th International Symposium on Industrial Electronics (ISIE), Jun. 13, 2018, pp. 1327-1330, doi: 10.1109/ISIE.2018.8433601.

Ando, T. et al., Head Mounted Display for Mixed Reality using Holographic Optical Elements, Mem. Fac. Eng., Osaka City Univ., vol. 40, pp. 1-6, Sep. 30, 1999, available at dlisv03.media.osaka-cu.ac.jp/contents/osakacu/kiyo/DB00000881.pdf.

Huebschman, M.L. et al., Holographic video display using digital micromirrors, Proc. SPIE 5742, Practical Holography XIX: Materials and Applications, pp. 1-15, Apr. 21, 2005, available at https://doi.org/10.1117/12.593144.

International Search Report for Application No. PCT/TR2019/050092, dated Feb. 20, 2020, pp. 1-10.

* cited by examiner

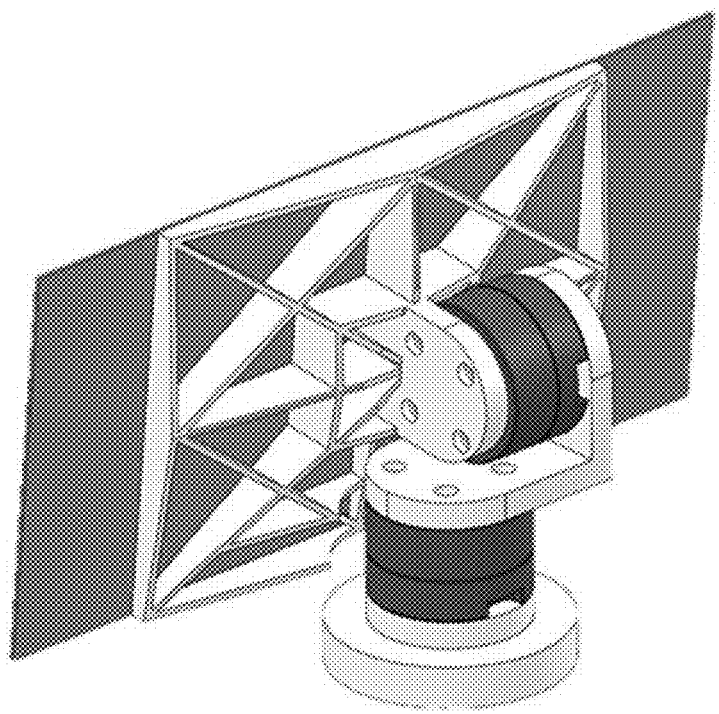
Figure 18
SLM (13) Tiling Options
1 SLM (13) 
2 SLMs  
3 SLMs   
4 SLMs   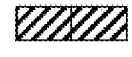
Figure 19a

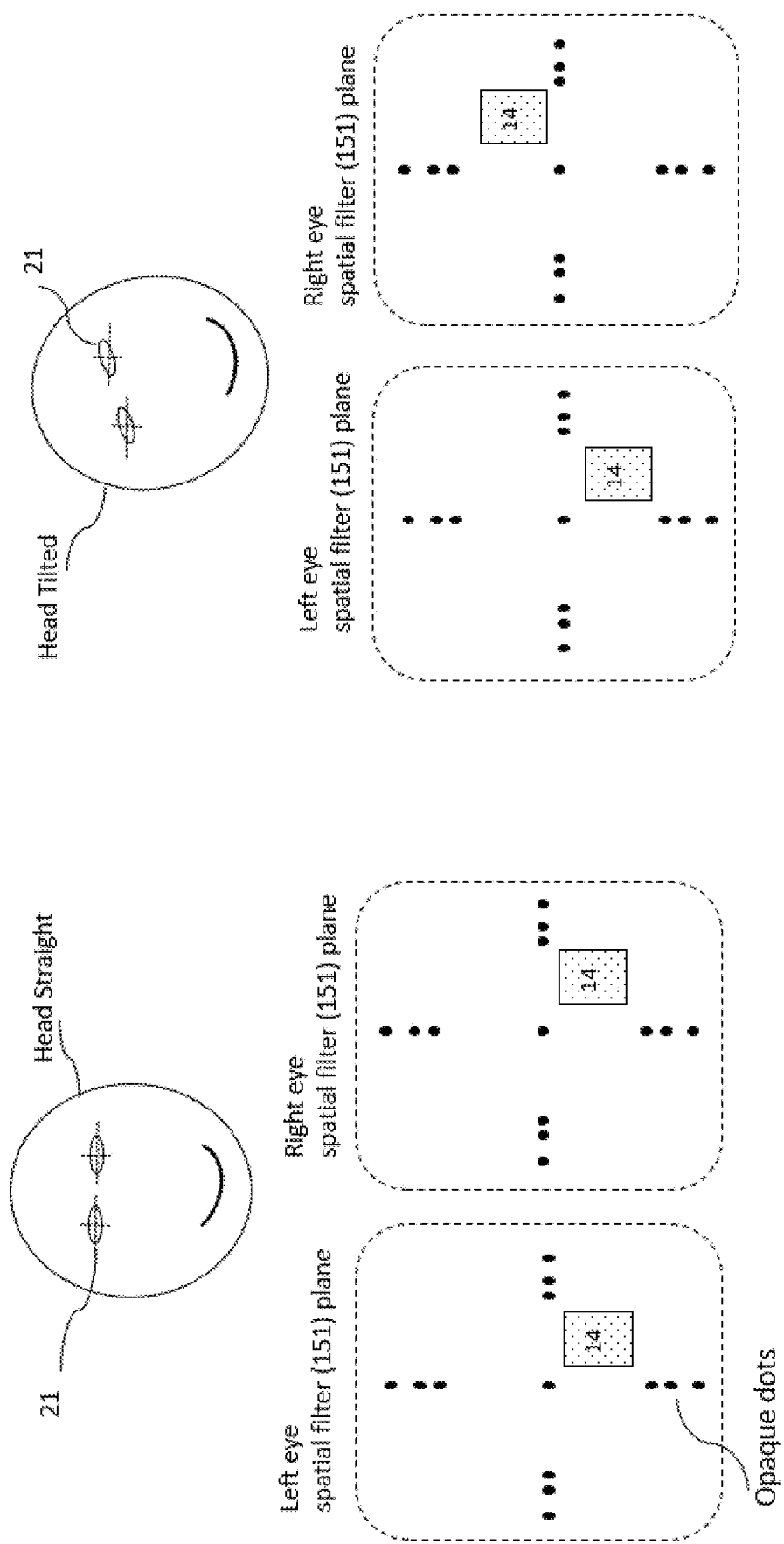

HOLOGRAPHIC HEAD-UP DISPLAY SYSTEM

PRIORITY CLAIM

This application is a continuation of PCT/TR2019/050092 filed 12 Feb. 2019, which is entirely incorporated by reference.

BACKGROUND

1. Technical Field

The disclosure generally relates to a head-up display system having a steerable exit pupil plane. More specifically, system and the teaching contained herein along with various embodiments relate to head-up display devices comprising a point light source, an optical steering apparatus and spatial light modulator elements which together form a means for displaying computer generated holograms on the surfaces of objects such as a windshield.

2. Background

Virtual head-up displays (HUD) are employed in aircraft, land vehicles, retail store windows to present a person/user with information overlaid onto immediate surroundings. Many vehicle HUDs make use of the inside surface of the windshield as an optical combiner to provide the user a 2D or 3D stereoscopic image of any relevant information to be delivered.

BRIEF SUMMARY

An important issue with traditional HUDs is that they lack abilities such as software-based aberration correction and eyebox adjustments. Aberration correction, in itself allows for a larger field-of-view (FOV) to be cast across a larger eyebox, albeit no single optical component can be designed to form a large FOV aberration-free image due to the fact that information radiating from the display is aberrated as it is reflected, such as from the windshield of the vehicle. A holographic HUD setup has many advantages over conventional HUD applications, such as the case where with a holographic head-worn device, a wide field of view (FOV) is attainable and aberration correction, as well as interpupillary distance are dynamically adjustable.

Dynamic holography includes a spatial light modulator (SLM) as an active optical element, which are devices that are dynamically programmable to implement 2-dimensional complex multiplicative optical transparencies that are functions of two spatial coordinates and time. In holographic display applications, SLMs are generally deployed to display computer-generated holograms (CGHs). Existing SLM technology in the art is commonly based on liquid crystal technology, liquid crystal on silicon (LCoS) technology, MEMS-based digital micromirror array technology to name a few. LCD SLMs are transmissive, whereas LCoS SLMs are reflective in principle. Transmissive SLMs based on liquid crystals have larger pixel pitch arising from the electric circuitry associated therewith having been embedded within the pixel aperture as a corollary. On the other hand, reflective LCoS SLMs can be made to have much smaller pixel pitches since it is possible to bury electronics under the pixel(s) in question. Although SLMs are ideally expected to provide full complex modulation, practical SLMs provide only some restricted type of modulation, such as phase-only, amplitude-only, binary modulation etc. A multitude of algorithms are designed such as the Gerchberg-Saxton, iterative Fourier and error diffusion in order to encode a desired full-complex hologram into a restricted form hologram. These procedures and applications generally result in the emergence of noise along with signal beams. Another practical issue with SLMs is that most SLMs do not possess 100% modulation efficiency, that is, only a fraction of the incident light gets modulated by the SLM, while rest of the light remains unmodulated. Almost all SLMs are pixelated devices, resulting in the generation of higher diffraction order replicas of signal, noise and unmodulated beams. In the case of holographic HUD designs, only the main signal beam should enter the eye and reach the retina, while beams from noise and unmodulated beams as well as higher diffraction order replicas should be blocked. This requirement necessitates additional measures.

One of the prior art publications in the technical field of the present disclosure may be referred to as WO 2016105285, which teaches a sharp foveal vision combined with low resolution peripheral display with a wide field-of-view (FOV) and a rotatable hologram module capable of creating a high-resolution steerable image. In another document, US US20180003981A1, a near-to-eye display device including an SLM, a rotatable reflective optical element and a pupil-tracking device are disclosed. The pupil-tracking device tracks the eye pupil position of the user and based on the data provided by said pupil-tracking device, the reflective optical element is rotated such that the light modulated by the spatial light modulator is directed towards the user's eye pupil.

DE 102011075884 discloses a head-up display device comprising a light-emitting image source along with optical elements that form a beam path. Optical elements comprise a holographic optical element with an optical imaging function and a reflector. Said reflector and the holographic optical element are arranged so that beams emitted by the former into a third section of the beam path can at least partly transilluminate the holographic optical element, wherein illumination angles of transilluminating beams in the third section of the beam path substantially deviate from angles of incidence at which part of the imaging function of the holographic optical element becomes effective.

GB 2554575 and EP 3146377 discloses a windscreen having spatially variant optical power likely to result in distortions, wherein the display has a shaped diffuser to compensate for the distortions of the windscreen and a holographic projector for projection of images thereon. The holographic projector has an SLM arranged to display a hologram representative of the image and apply a phase delay distribution to incident light, wherein the phase delay distribution is arranged to bring the image to a non-planar focus on the diffuser. The HUD may have a mirror with an optical power, or parabolic curvature, to redirect light from the diffuser onto the windscreen. In another aspect of application, a method of compensating for the spatially variant optical power of a windscreen is provided using the apparatus above wherein a virtual image is formed using the windscreen.

Features of the Head-Up Display System

One feature of the system is to provide a holographic HUD device consisting of at least one light module that is capable of providing virtual images at multiple depths.

Another feature of the system is to provide a holographic HUD device with steerable exit pupils across an exit pupil plane.

A further feature of the system is to provide a holographic HUD device having at least one SLM, where corrections of aberration and interpupillary distance are calculated on at least one computer or processor circuitry and implemented on the SLMs to increase image quality and achieve large FOV.

A still further feature of the system is to provide a holographic HUD device that utilizes beam steering simultaneously to deliver rays to both eyes of a user.

A still further feature of the system is to provide a holographic HUD device where optical steering is utilized on two exit pupils separated by an adjustable interpupillary distance.

A still further feature of the system is to provide a holographic HUD device which utilizes partially real-time rendering for stereographic holography.

It is to be noted that in the head-up display system, holographic stereograms are the means for producing a three-dimensional effect. In one embodiment, different, separate SLM modules are responsible for steering of beams to each eye box of a user.

According to one embodiment, a holographic head-up display generated on the surface of vehicle windshield proves advantageous as it is effective in correcting aberration so as to limit spread and therefore enhance control thereof, as well as what is provided with transmissive and reflective elements and combinations thereof in different embodiments.

According to an embodiment, an eye-tracking system for pupil tracking projection assembly based on a camera system relays information concerning pupil position to a processor circuitry with the aim of interpupillary distance calculation, following which said IPD outcome is used for adjustment of computer-generated hologram through simultaneous beam steering for both eyes of a user.

According to one embodiment, spatial positioning of the steering mirror after the imaging lens forms a hierarchy between components, which possess optical power, and components, which do not.

BRIEF DESCRIPTION OF THE DRAWINGS

Accompanying drawings are given solely for the purpose of exemplifying an object reconstruction system, whose advantages over prior art were outlined above and will be explained in brief hereinafter.

The drawings are not meant to delimit the scope of protection as identified in the claims nor should they be referred to alone in an effort to interpret the scope identified in said claims without recourse to the technical disclosure in the description of the present invention. The drawings are only exemplary in the sense that they do not necessarily reflect the actual dimensions and relative proportions of the respective components of any system or sub-system.

FIG. 19*a* demonstrate various tiling options at different orientations using one, two, three or four SLMs.

FIG. 24*a* demonstrates an example software based compensation for head tilt.

FIG. 24*b* demonstrates another example software based compensation for head tilt FIG. 25*a* demonstrates an example of moving the exit pupil vertically for one eye to compensate for head tilt.

DETAILED DESCRIPTION

Figure 1:
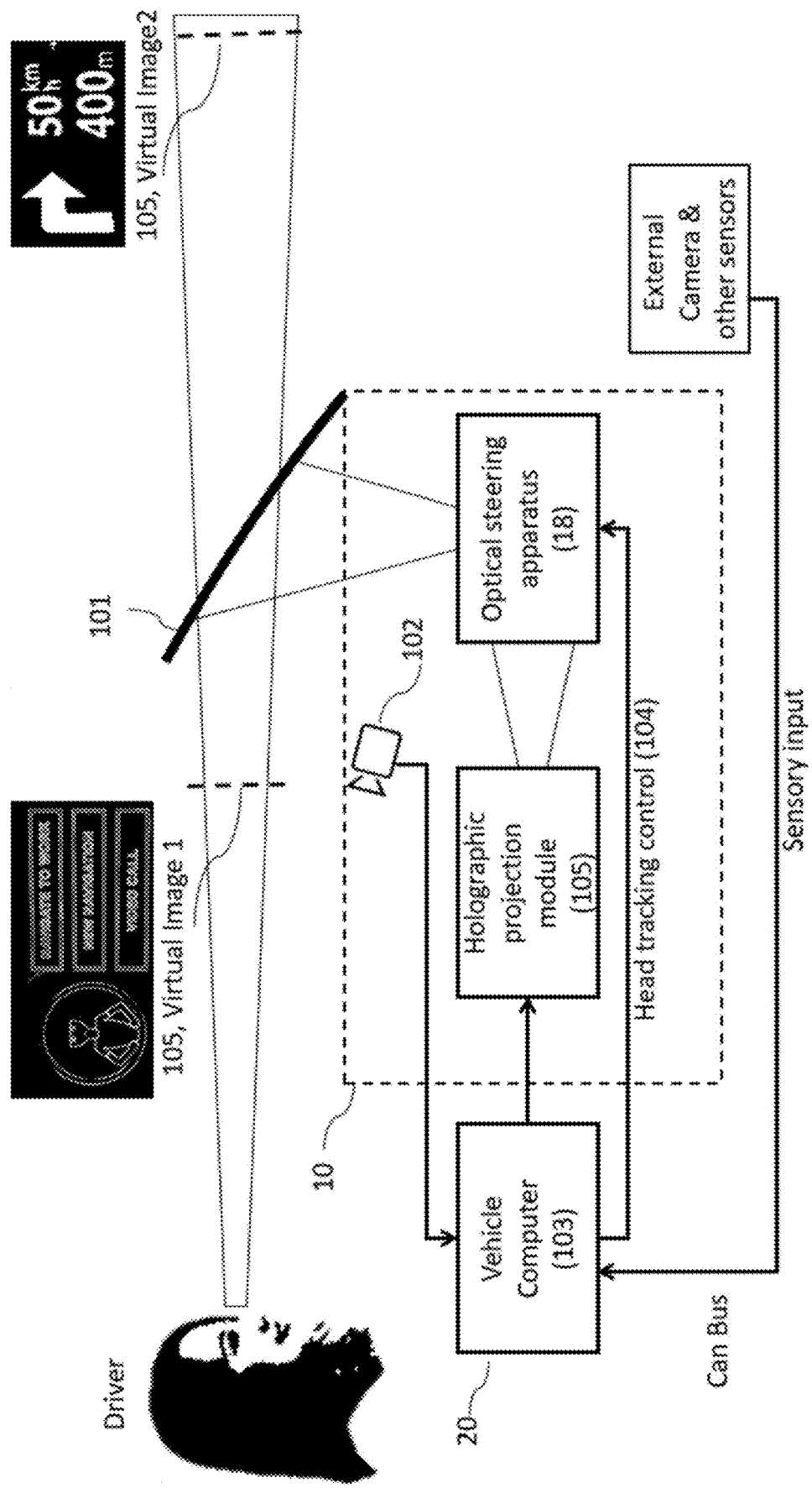
FIG. 1 demonstrates the general schematic view of a holographic HUD and the interface to the vehicle computer and sensors.

The following numerals are referred to in the detailed description:
10) Head-up display device
101) Windshield
102) Head-tracker camera
103) Vehicle computer
104) Head-tracking control
105) Virtual image
106) Holographic projection module
107) Virtual SLM
11) Light source
111) Illumination lens
12) Light module
13) Spatial light modulator (SLM)
13R) SLM pixels dedicated for red content
13G) SLM pixels dedicated for green content
13B) SLM pixels dedicated for blue content
14) Desired modulated beam
141) Undesired beams
15) Optical filter
151) Spatial filter
151c) Red, green, blue color filters at spatial filter plane
16) Exit pupil
17) Exit pupil plane
18) Optical steering apparatus
19) Head tracking system
20) Processor circuitry
21) User's eye
22) Imaging lens
23) Steering mirror
24) Interpupillary distance (IPD)
25) SLM image
26) AR screen
27) Tracking spot
28) Light source array
29) Peripheral display
30) Central display
31) Foveated display
32) Intermediate image plane
33) Beam splitter (BS)
34) Polarizer
35) Half wave plate
36) Acousto-optic scanner
37) Magnifying prism pair
38) Mirror assembly A device and a system in the form of a computer-generated holographic projection display device and a system comprising thereof is disclosed. More specifically, a device and a system for holographic head-up display (HUD) projection seen through a vehicle windscreen.

Referring to FIG. 1, the holographic HUD (10) comprises of holographic projection module (106) containing the optical system and electronics, optical steering apparatus (18) aimed to create a steerable eyebox in front of the driver's eyes, a head tracker camera (102) for tracking the driver's head motion, face, and pupils, and a head tracking control (104) system. Other input from external sensors and vehicle's sensors as well as the input from the head-tracking control (104) are analyzed at the vehicle computer circuitry (103) and the proper content is calculated to be shown at the HUD (10) system. The driver sees the virtual image (105) at the distance determined by the holographic HUD (10). CGH can contain multiple virtual images (105) that appear at different depths to the user's eye (21).

Figure 2:
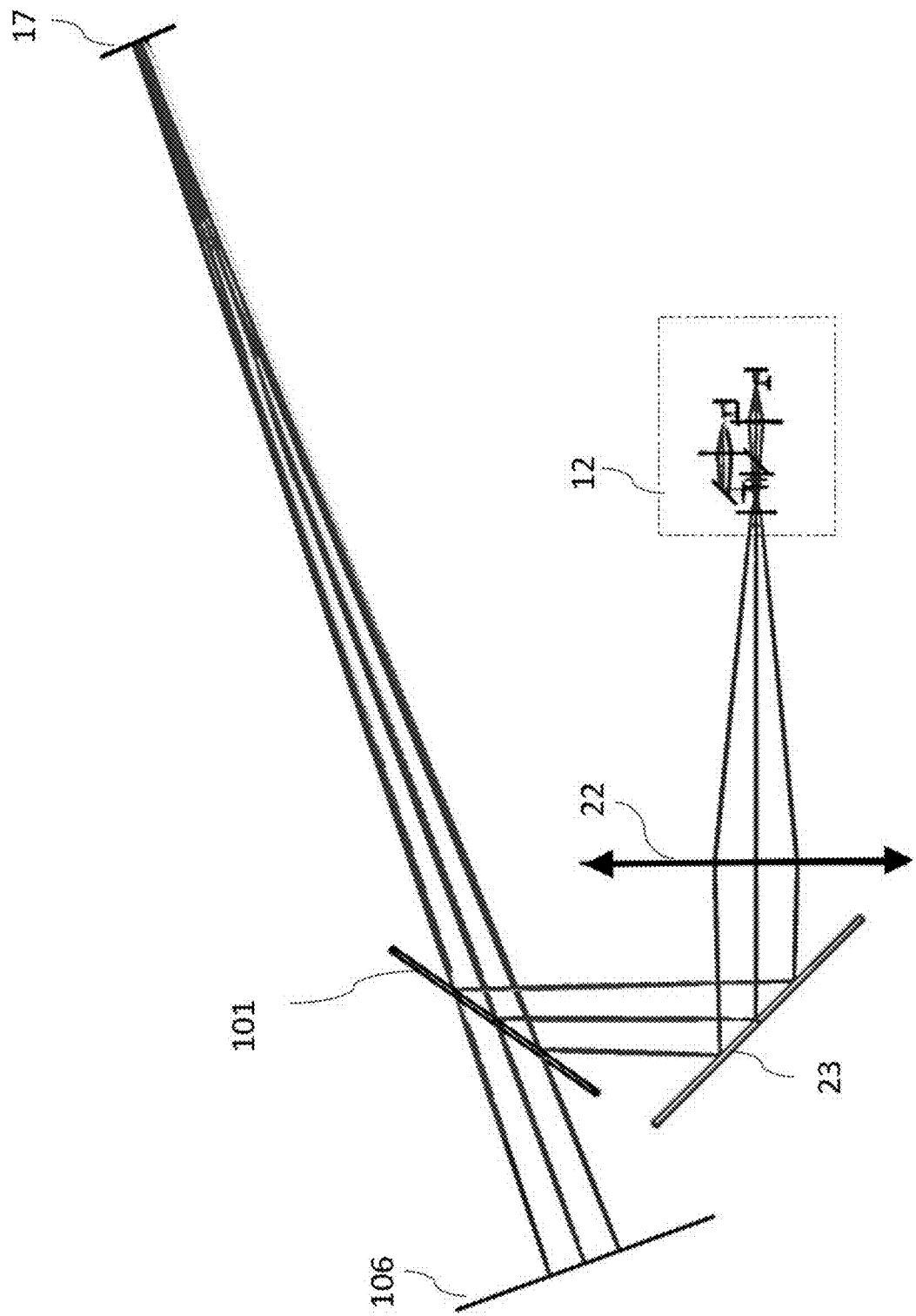
FIG. 2 demonstrates light module and imaging system that forms a virtual image behind a windscreen.

Referring to FIG. 2, the HUD (10) device optics form exit pupil(s) (16) at the exit pupil plane (17) and a virtual SLM image (25) formed by the imaging lens (22) appears behind the windscreen (101). Light module (12) consists of at least one from each of the following components: SLM (13), light source (11), source lens (111) for beam shaping and fold mirror. The figure shows a cross-sectional view. One light module (12) is needed for each eye of the user. In this embodiment steering mirror (23) is after the imaging lens (22), which results in smaller footprint for the beam on the steering mirror (23). The field-of-view (FOV) of the system can be measured from the exit pupil plane (17) to the footprint on the windscreen (101). For a fixed FOV, rotation of the steering mirror (23) moves the exit pupil (16) location without increasing the size of the optical beam on the imaging lens (22).

Figure 3:
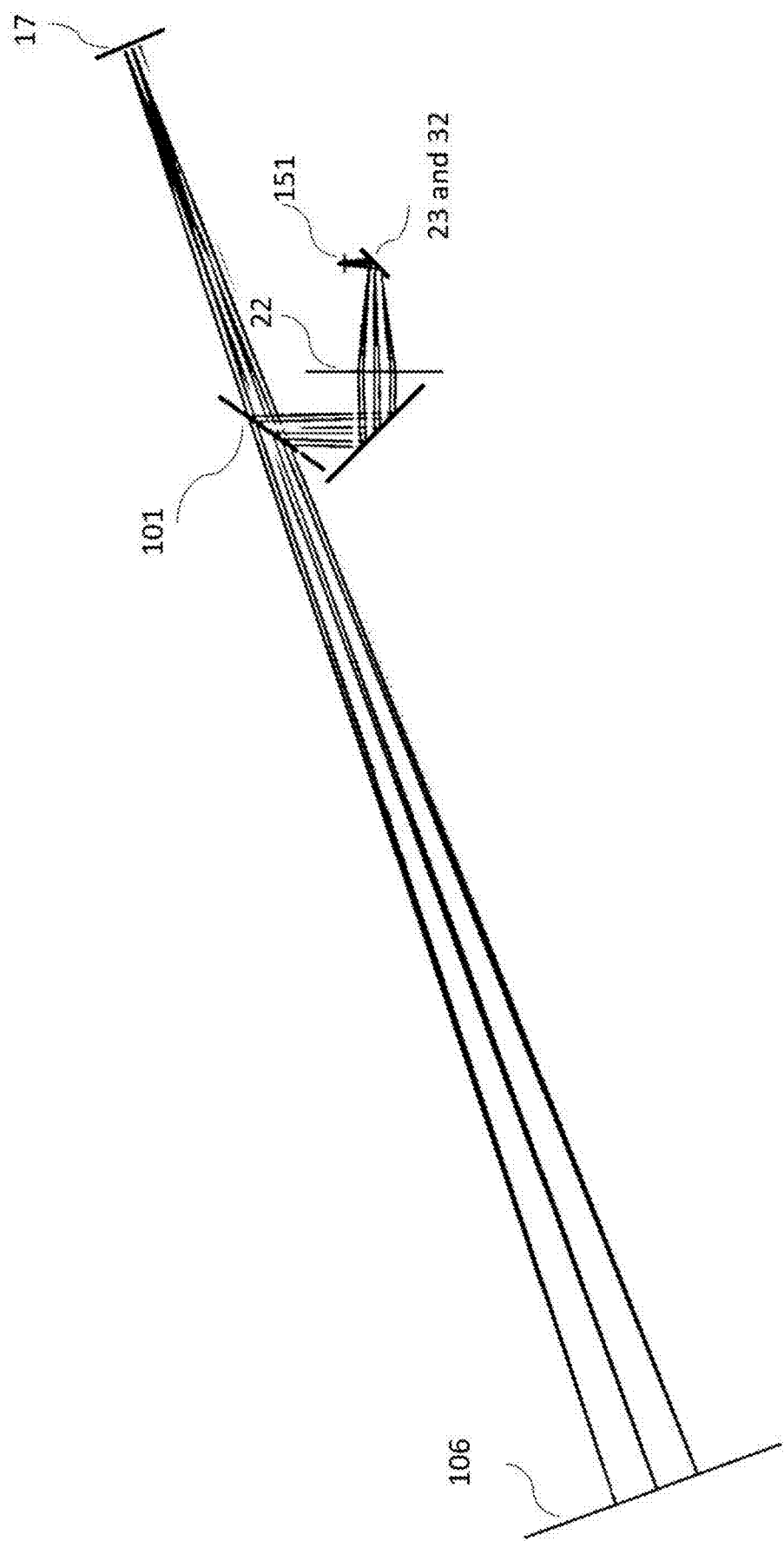
FIG. 3 demonstrates light module and imaging system that forms a virtual image behind a windscreen using a steering mirror at an intermediate image plane.

FIG. 3 shows another embodiment, wherein the steering mirror (23) and the intermediate image plane (32) of the SLM (13) coincides. The imaging lens (22) appears after the steering mirror (23). Virtual SLM (107) plane is the optical conjugate of the intermediate image plane (32). When the steering mirror (23) plane coincides with the intermediate image plane (32), rotation of the steering mirror (23) does not change the location of the virtual SLM plane (107). Spatial filter (151) plane is an optical conjugate of the exit pupil plane (17). Instead of the steering mirror (23), SLM (13) or the entire light module (12) can be rotated for moving the exit pupil (16) location across the exit pupil plane (17).

Referring to FIGS. 1 through 4, a head-up display device (10) is provided comprising at least two light modules (12), each of which further comprise at least one light source (11) together with an SLM (13); in the form of a computer-generated hologram display device seen through a vehicle windshield (101) according to at least one embodiment.

Device and system disclosed rely on display of said computer-generated holograms to spatially modulate light incident from said at least one light source (11). Computer-generated holograms are displayed on an interior surface of a vehicle windshield (101) as a means for peripheral interaction and retrieval of information regarding the surroundings and the vehicle in question (i.e. navigation/map, gauges such as speedometer, and other dashboard elements). System disclosed, comprising the HUD device also disclosed herein; proposes a configuration characterized with achieving a large field-of-view (FOV) and compliance with the concave surface(s) of vehicle windshield(s) (101) in question. Windshield (101) can be a wedge shaped windshield with varying thickness across in order to steer ghost reflection from the back surface away from the exit pupil(s) (16).

Figure 4:
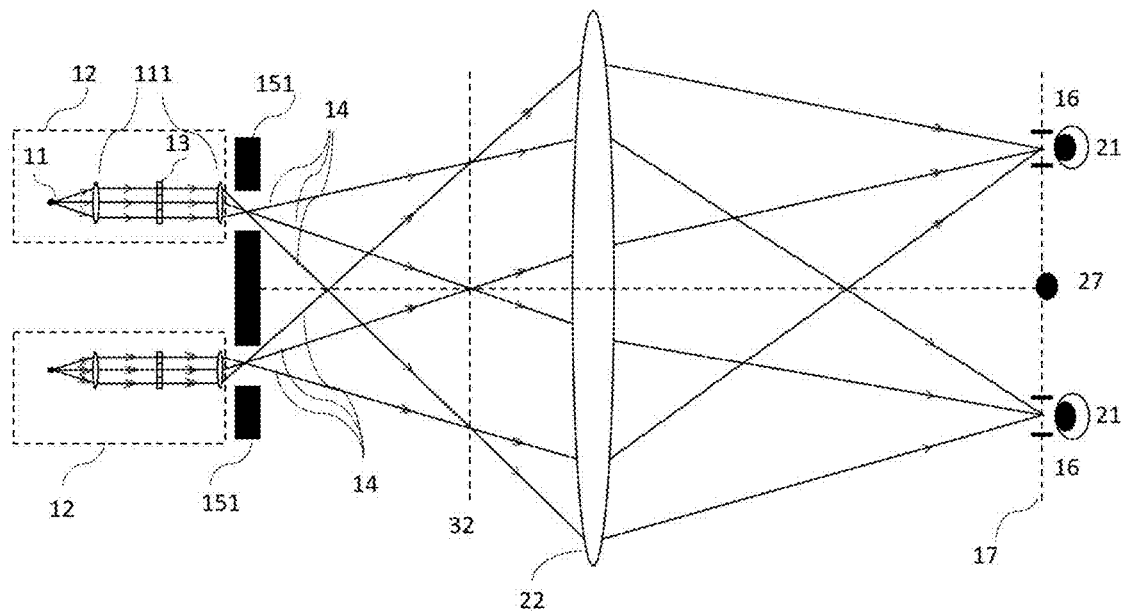
FIG. 4 demonstrates a HUD system architecture using a spatial filter to eliminate undesired beams generated by SLMs.

FIG. 4 shows a general schematic view of a holographic HUD device (10) comprising a light source (11), two light modules (12), imaging lens(es) (22) and a spatial filter (151). Light source (11) is followed by the illumination lenses (111), which can be located before or after the SLM (13) and deliver rays to the spatial filter (151) plane.

Referring to FIG. 4, HUD basic optical system architecture uses a spatial filter (151) to block the undesired beams (not shown in the figure) generated by the SLM (13) and let the desired modulated beams (14) (the beams that would provide the visual information to the viewer within the exit pupils (16)) reach the exit pupil plane (17). Two light modules (12)—one per eye—are utilized to form an initial copy of the exit pupils (16). The visual information is generated by the computer-generated holograms displayed on the SLMs (13).

Each light module (12) images the at least one point light source (11) onto the spatial filter (151) plane, where for each module, the light distribution is essentially given by the Fourier transform of the SLM transmittance function, apart from trivial multiplicative phase factors. In another embodiment the HUD may have a single light module for both eyes with two point light sources (one for each eye). The undesired beams (141)—the unmodulated beam, noise beam, and higher order replicas—get spatially separated in the spatial filter (151) plane, and hence can be filtered out with apertures that let only the desired beam to pass unaffected. In FIG. 4, the optics module is implemented as a simple 4-$f$ telescope. In an actual design, it should be noted that this module can be any imaging system that images the source to the spatial filter plane (151$c$), and may include reflective, refractive, multi-part, conventional, diffractive, freeform components, some of which may be used off-axis and/or to introduce folds. Likewise, SLM (13) is illustrated as a transmissive component, but it can be reflective component. In a different embodiment, off-axis illumination directly from the light source (11) or a waveguide plate can be used to illuminate the SLM (13). Waveguide plate can be used to couple light in and out of the waveguide, which guide the light using total internal reflection.

The spatial filter (151) plane, consisting of the apertures that only pass the signal beams for left and right eye, gets imaged to the actual exit pupil plane (17) where the eyes of the viewer would be present. That imaging is performed in the figure by the imaging lens (22). The imaging may in general perform a non-unity magnification. Most likely, it will be desired that the optics modules residing in the back side of the system occupy minimum possible volume, so that the copies of the exit pupils (16) on the spatial filter plane (151$c$) are much closer to each other than the typical human interpupillary distances (24). In such cases, magnification of the imaging system would be greater than unity and the imaging system can cause optical distortions and aberrations. In this figure, the imaging between spatial filter (151) and exit pupil planes (17) is accomplished with a single imaging lens (22). In an actual design, it should be noted that this lens can be replaced with an arbitrary imaging system that may include reflective, refractive, conventional, multi-part, diffractive, freeform components, some of which may be used off-axis and/or to introduce folds. In the figure, the virtual image (105) observed by the viewer is first formed as a real or virtual image (105) on the intermediate image plane (32). This image is mapped to the final virtual image (105) by the imaging lens (22). Note that the location of the intermediate image plane (32) depends on the distance of the virtual object plane from the user. For a 3D virtual content, the intermediate image planes (32) for each virtual object plane form a continuum. In this architecture, the CGHs on the SLMs are not Fresnel holograms. The CGH for each virtual object point occupies only a sub-region of the SLM aperture. In some designs, the SLM is conjugate to a virtual image (105) plane. In that case, the CGH essentially resembles the image itself, apart from distortions and possible multiplicative phase terms for aberration correction on the exit pupil plane (17).

As illustrated in FIG. 4, at least one pointing laser beam, preferably an infrared laser beam, can be part of the light module (12) and provide a substantially focused tracking spot (27) at the exit pupil plane (17). The tracking spot (27) or multiple tracking spots (27) can easily be detected by the head tracking system (19) and provide automatic calibration for finding the user's eye (21) to direct the exit pupil (16) towards the user's eyes (21).

Figure 5:
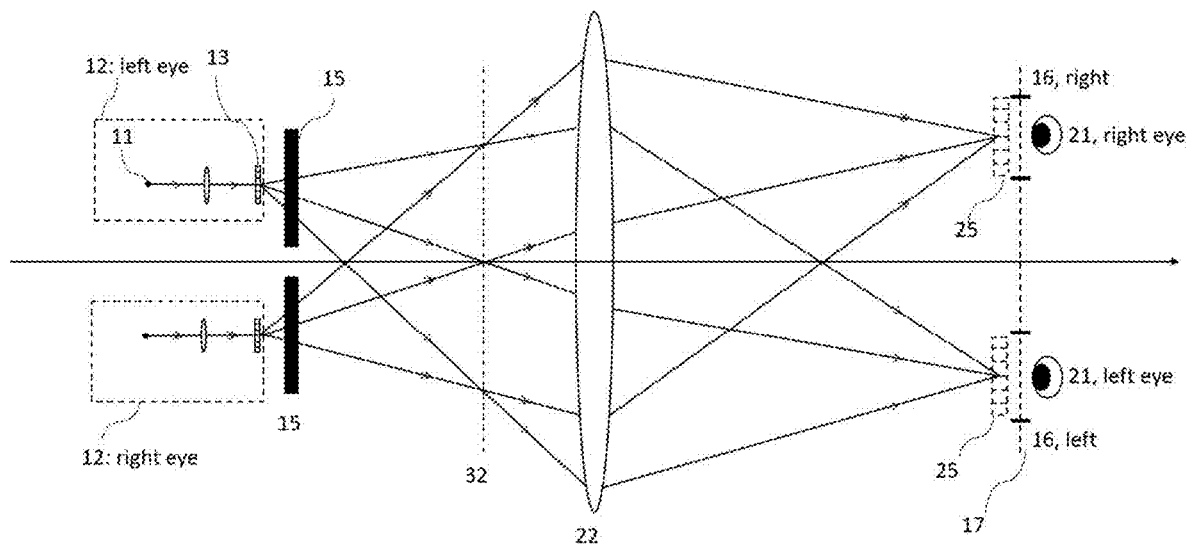
FIG. 5 demonstrates an alternative HUD system architecture using an angle-selective filter after SLMs and projecting the SLM onto the pupil of the user.

Referring to FIG. 5, in an alternative embodiment, two SLMs (13) are directly imaged on the exit pupil plane (17). If no spatial filtering is applied to the light emerging from the SLM (13), all the undesired beams (141)—unmodulated beam, noise beams, higher order replicas—will contribute to the SLM images (25) formed on the exit pupil plane (17), and lead to undesired ghost images, contrast reduction, bright spots in the background. An angle selective optical filter (15) placed after the SLM can be used to eliminate the undesired beams (141), so that the SLM images (25) on the exit pupil plane (17) are formed only by the information bearing signal beams.

The angle selective optical filter (15) may be implemented with holographic optical elements (HOE) that have intrinsic angle and wavelength selectivity, or with conventional optics that uses prisms, apertures, or a combination. In this embodiment, the CGHs on the SLMs are Fourier holograms. The CGH for each virtual object point occupies the entire SLM aperture. Apart from multiplicative phase terms, the CGH is essentially given by the Fourier transform of the desired image.

Figure 6:
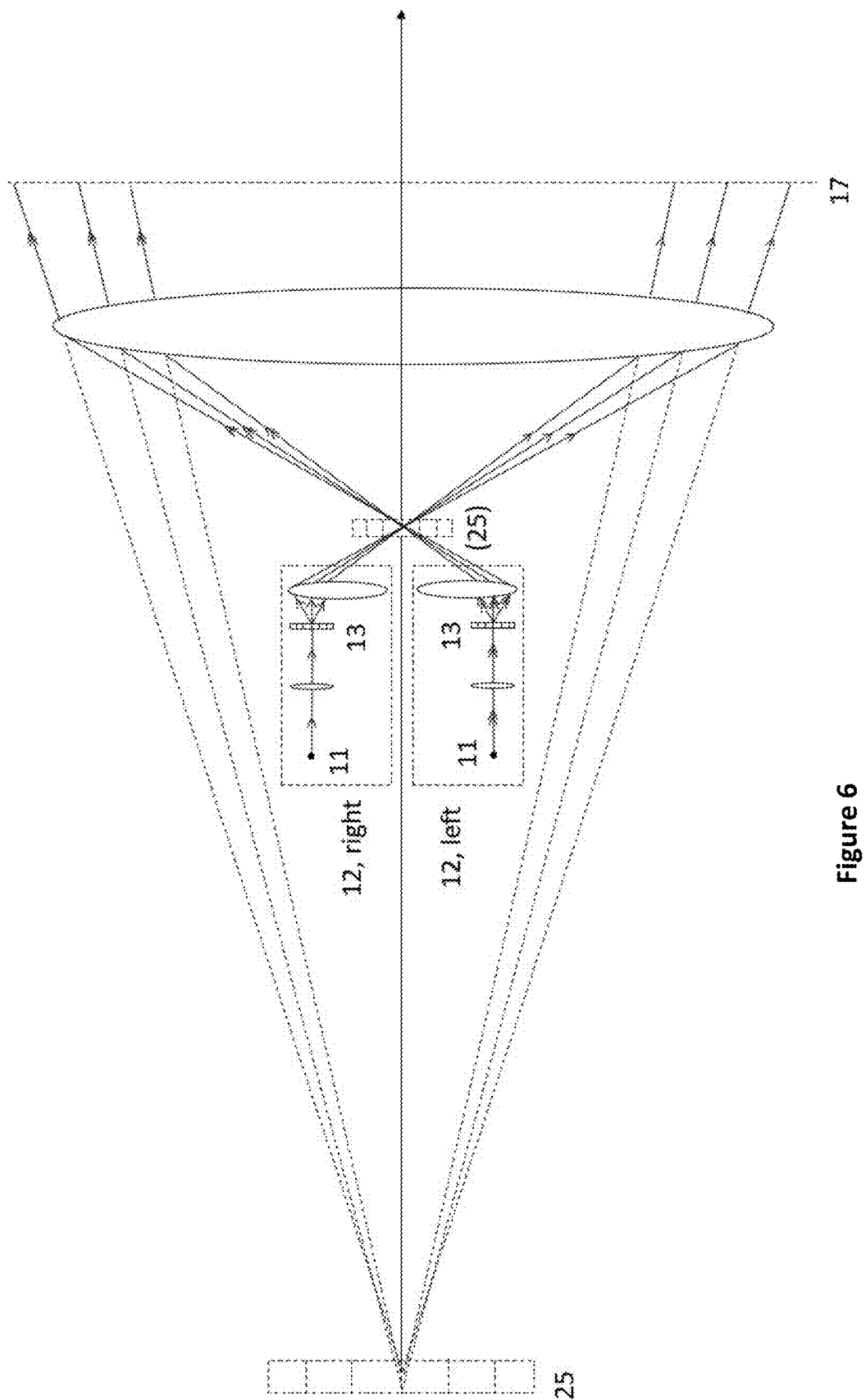
FIG. 6 demonstrates an optical architecture where, as seen by the viewer, the SLMs appear at a plane behind the imaging lens, according to the present invention.

Referring to FIG. 6, in some embodiments, the HUD optics form virtual images (105) of the SLM (13) that lie beyond the imaging lens (22). In the figure, the virtual SLM images (25) are aligned so that the centers of left and right virtual SLM images (25) coincide. In other embodiments, there may be an offset in between, as well to increase the perceived field of view. In the illustrated embodiment, real images of the SLMs are also formed at a plane between the light modules (12) and imaging lens (22). That plane also corresponds to an intermediate image plane (32) as well. In some embodiments, a steering mirror (23) may be placed at that location, so the location of the exit pupils (16, left) and (16, right) on the exit pupil plane (17) can be moved together when the steering mirror (23) rotates.

Figure 7:
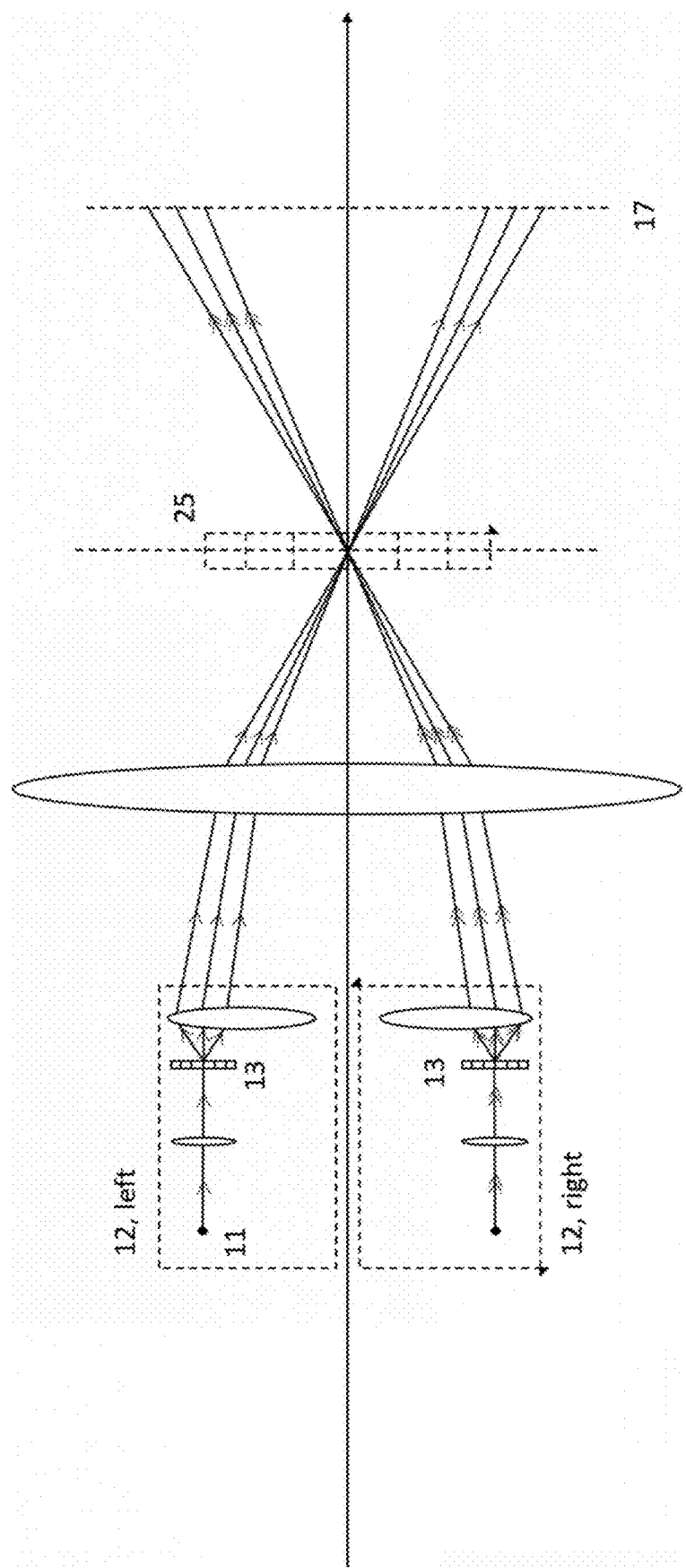
FIG. 7 demonstrates an optical architecture where, as seen by the viewer, the SLMs appear at a plane between the imaging lens and the viewer.

Referring to FIG. 7, the HUD (10) optics form real image of the SLMs (13) on the viewer side of the imaging lens (22). In the figure, the SLM images (25) are aligned so that the centers of left and right SLM images (25) coincide. In other embodiments, there may be an offset in between, as well to increase the perceived field of view. In the illustrated embodiment, real images of the SLMs are also formed at a plane between the imaging lens (22) and exit pupil plane (17). In some embodiments, a steering mirror (23) may be placed at that location, so the location of the exit pupils (16) on the exit pupil plane (17) may be moved together. The real SLM images (25) may also form on or after the exit pupil plane (17) in some alternative embodiments.

Figure 8:
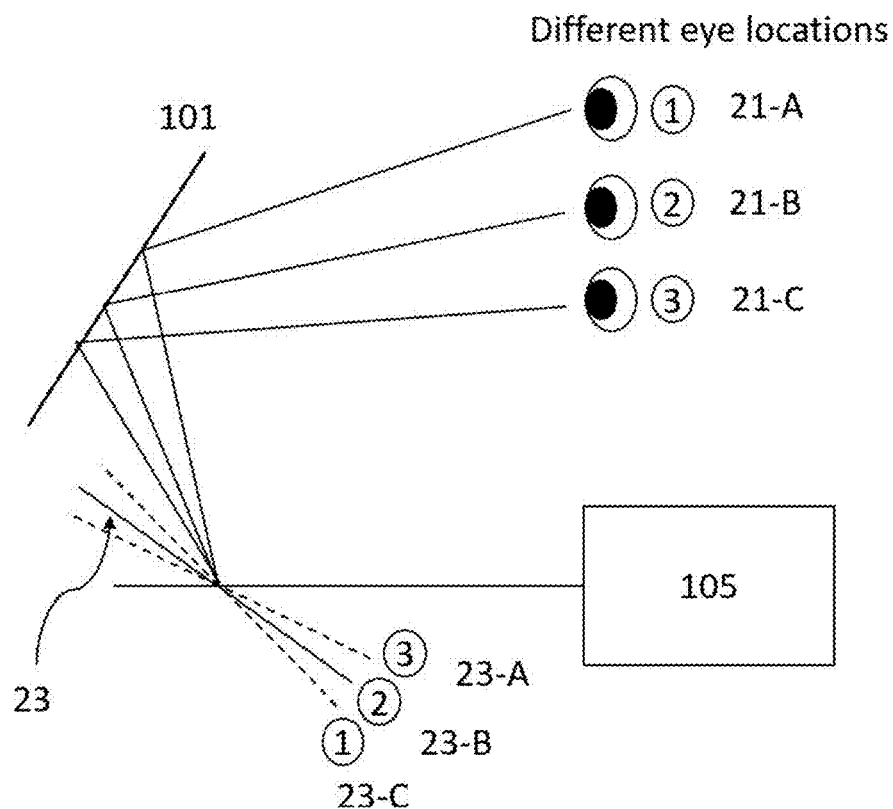
FIG. 8 demonstrates movement of the eye box in response to tilting motion of a steering mirror according to the present invention.

Referring to FIG. 8, holographic projection module (106) provides illumination to the optical steering system (18), which is illustrated with a scanning mirror or a steering mirror (23) in the current embodiment. As the user's eye (21) moves to different locations shown as 21-A, 21-B, 21-C, head tracking system (19) detects the new position of the user's eye (21) and the steering mirror (23) is deflected to positions 23-A, 23-B, and 23-C.

Figure 9A:
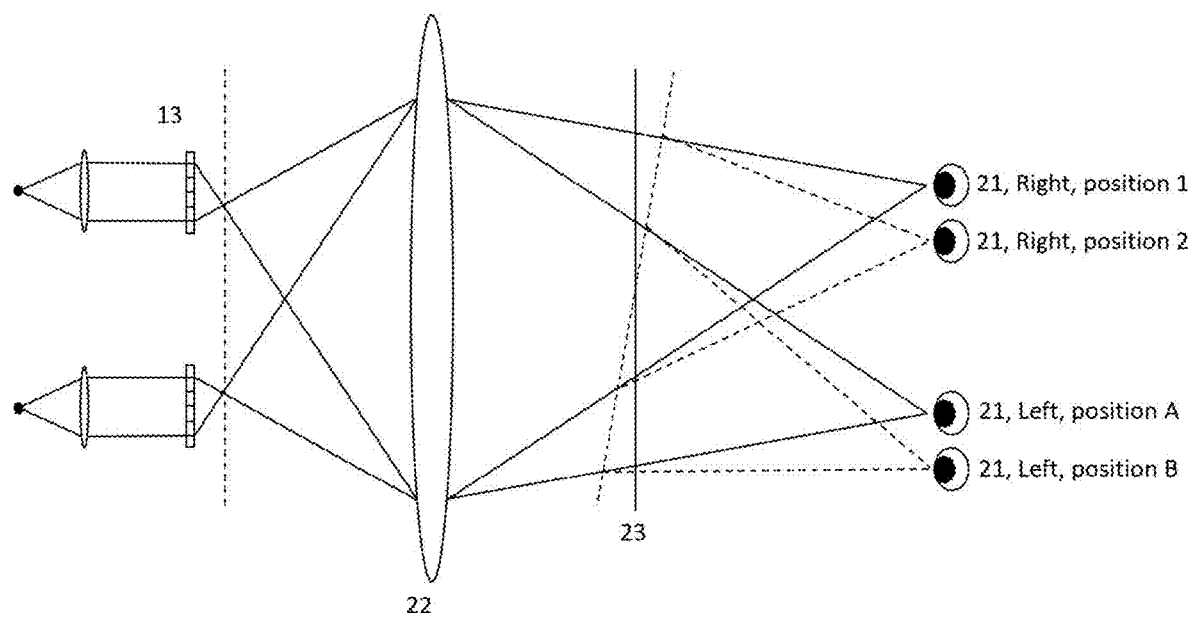
FIG. 9a demonstrates an optical architecture where the steering mirror is placed at a plane between the imaging lens and the exit pupil plane, in top view according to the present invention.
Figure 9B:
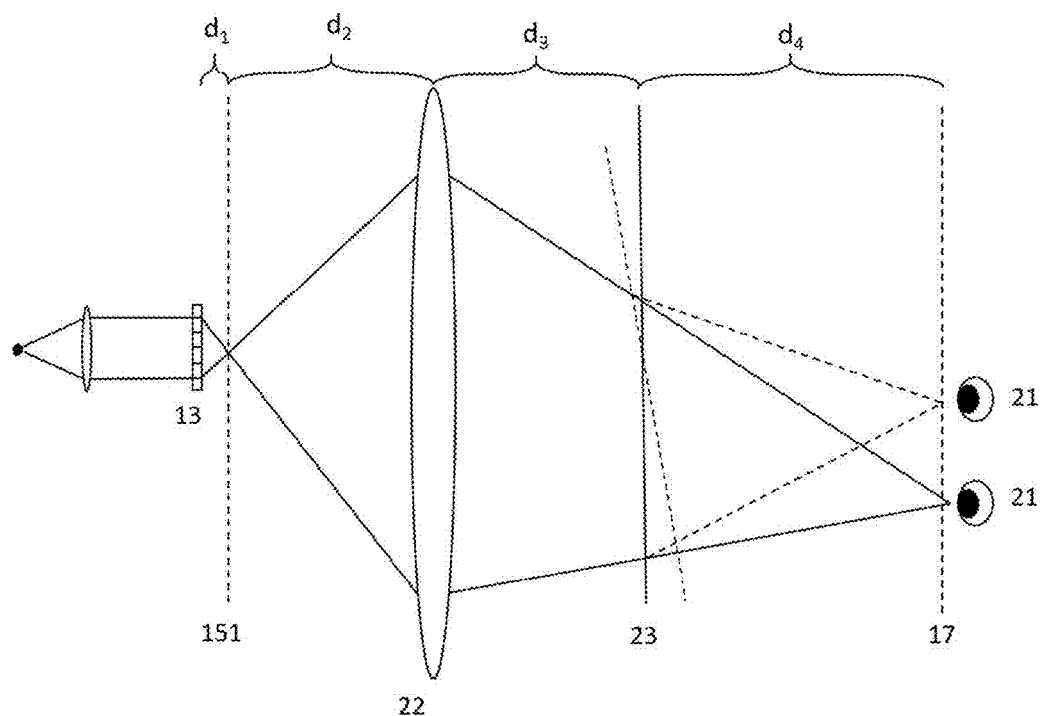
FIG. 9b demonstrates an optical architecture where the steering mirror is placed at the location of the SLM image that forms between the imaging lens and the exit pupil plane, in side view according to the present invention.

Referring to FIG. 9a (top view) and FIG. 9b (side view), a steering mirror (23) effectively rotates the virtual space lying behind it around its axis of rotation. Rotation of the steering mirror (23) can cause rotation of the virtual objects as well. Therefore, in general, the CGHs need to be calculated for each new exit pupil (16) position. Correct perspective images need to be rendered according to the location of the users' left and right eyes (21, left) and (21, right) and their positions. In particular cases, where the steering mirror (23) is conjugate to an object plane (such as illustrated by FIG. 9b), the virtual object placed on the virtual image (105) plane remains stationary, regardless of the rotation of the steering mirror (23). In FIG. 9b, the spatial filter (151) plane is an optical conjugate of the light source (11) and the exit pupil plane (17). Given the distances illustrated in FIG. 9b and assuming the imaging lens (22) has an effective focal length of f, the following relationships are satisfied in the current embodiment.

$$\frac{1}{d_2} + \frac{1}{d_3 + d_4} = \frac{1}{f} \quad \text{equation 1}$$

$$\frac{1}{d_1 + d_2} + \frac{1}{d_3} = \frac{1}{f}$$

Referring to FIG. 9a, the steering mirror (23) is placed at a plane between the imaging lens (22) and exit pupil plane (17). In such cases, the required mirror clear aperture size will be large, but required tilt angles will be small. Also the imaging lens (22) will be small.

Figure 9C:
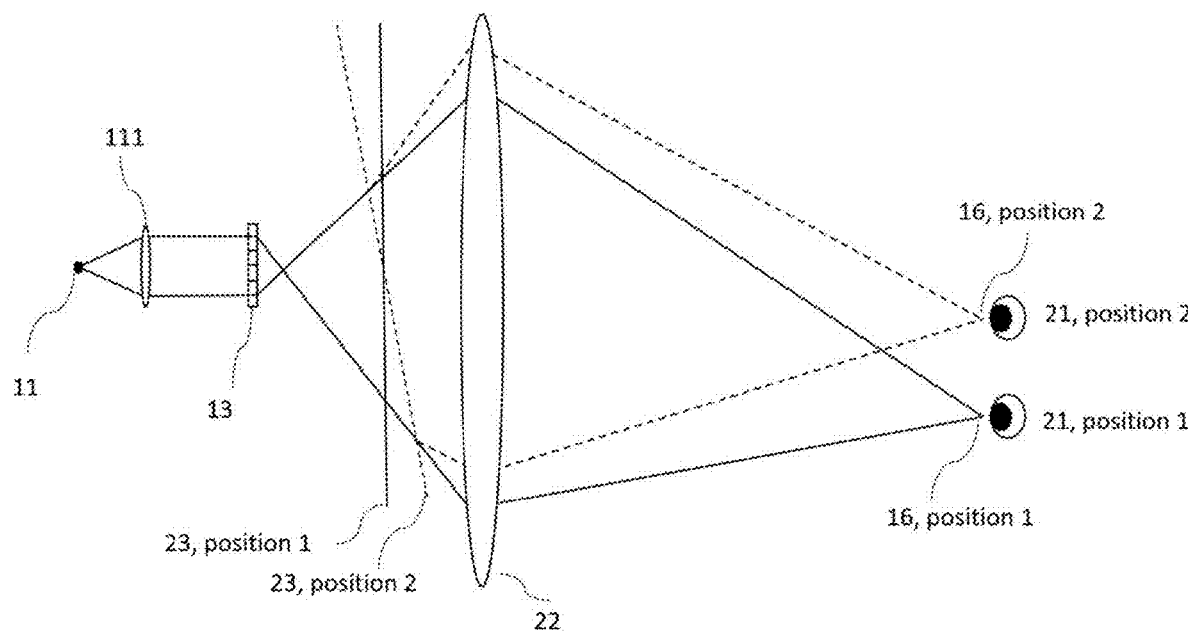
FIG. 9c demonstrates an optical architecture where the steering mirror is placed between the SLMs and the imaging lens, in side view according to the present invention.

In FIG. 9c, the steering mirror (23) is placed at a plane between the spatial filter (151) plane and the imaging lens (22). In such cases, the required clear aperture of the steering mirror (23) will be smaller, but required tilt angles will be larger. Note that for the same field of view, the required clear aperture size for the imaging lens (22) for FIG. 9a is smaller in comparison to that of FIG. 9c. Smaller clear aperture provides important additional advantages as it reduces the aberrations caused by the imaging lens (22) or lenses and reduces the overall volume of the HUD (10) optics.

Figure 10A:
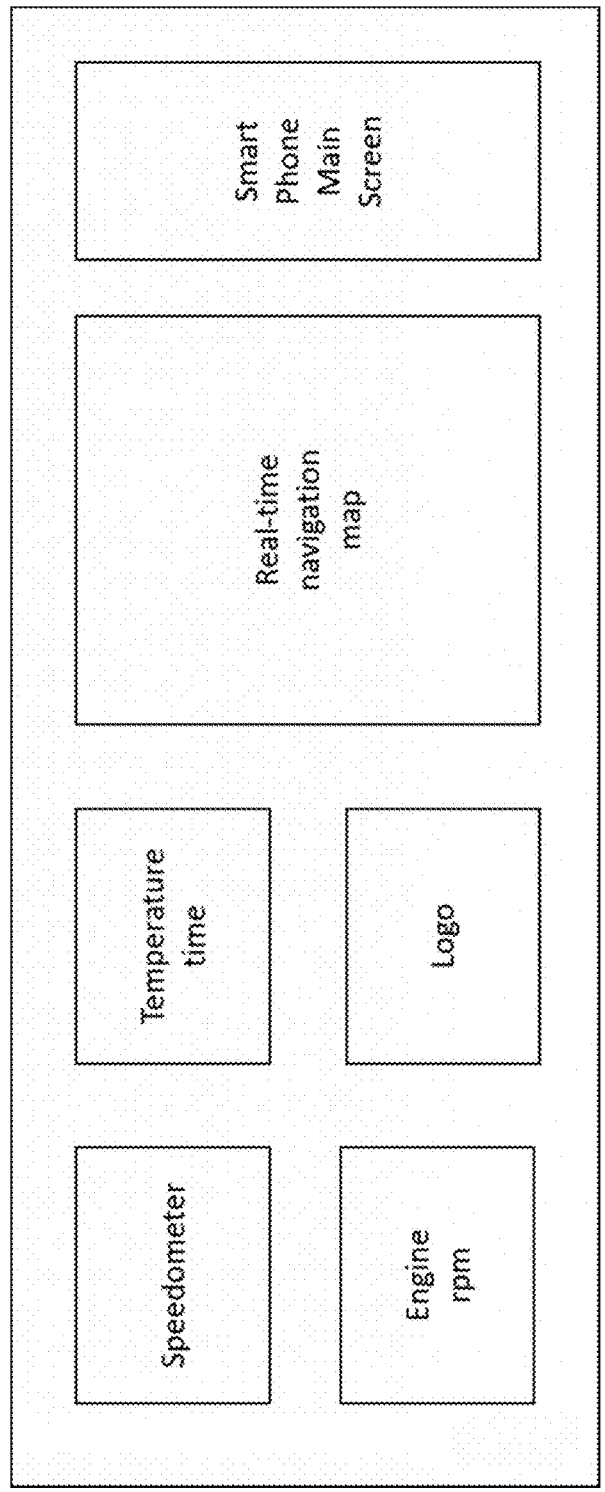
FIG. 10a demonstrates an example of a dashboard image layout to be displayed on the HUD.
Figure 10B:
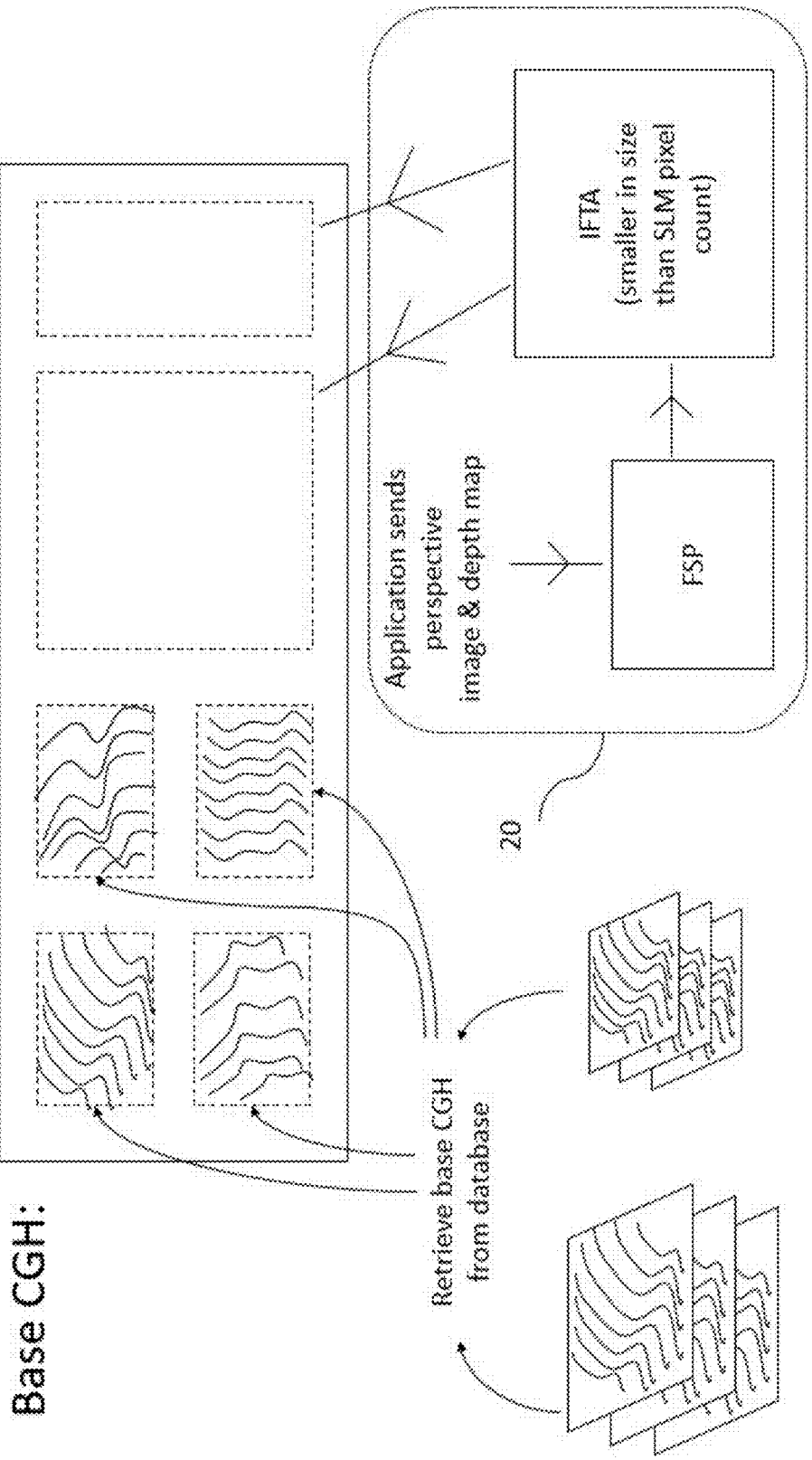
FIGS. 10b and 10c demonstrate the image layout-associated procedure for computer-generated hologram (CGH) computation according to the present invention.
Figure 10C:
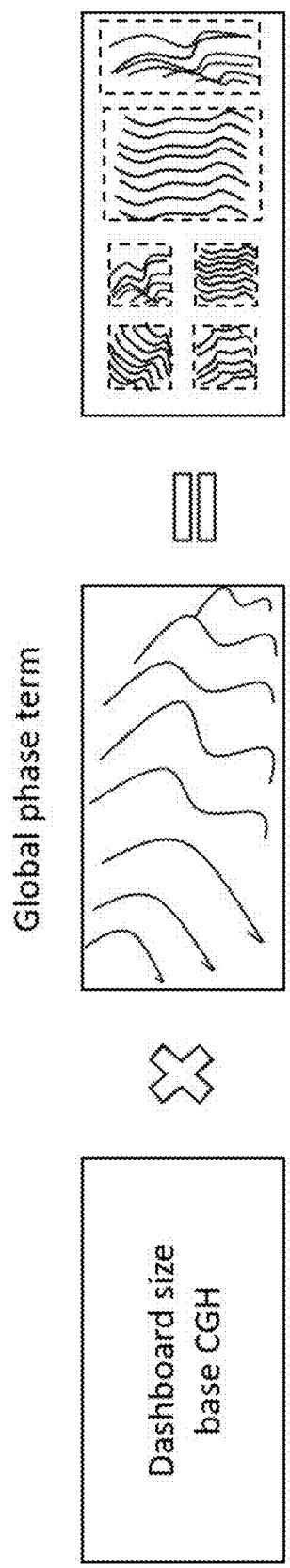

FIG. 10a illustrates a typical dashboard image to be displayed on HUD (10) and FIG. 10b illustrates the associated procedure for CGH computation. Part of the dashboard data consists of speedometer, engine RPM, temperature, time readings, and logos. This part of the data is generated from a limited finite set of possibilities. To speed up the CGH computation, the base CGHs (the part of the CGH excluding final phase term multiplications) for such parts can be precomputed and stored to some memory in the hologram computation processor or the vehicle computer (103), and the appropriate CGH can be retrieved based on instantaneous cruise data. Other parts of dashboard data, such as navigation maps, video feeds from side view mirrors, rear mirror, and backing cameras or mirror image of a smart phone main screen, need to be generated from a much larger set of possibilities and they are referred to as dynamic parts. The corresponding CGH for the dynamic parts need to be computed real-time. For this part, real time computation can utilize computational resources such as GPUs, FPGAs, ASICs. The computation, involving possible iterations such as free-space propagation (FSP) and iterative Fourier transform algorithms (IFTA), can be carried with simulation windows covering merely the size of the related sub-images, i.e., the simulation window pixel count does not need to be as large as the SLM pixel count. Once base CGHs for precomputed parts are retrieved and for dynamical parts are calculated, dashboard image size base CGH can be obtained. These can be appropriately combined, and multiplied with possible phase terms to get the final CGH as illustrated in FIG. 10c.

Figure 11A:
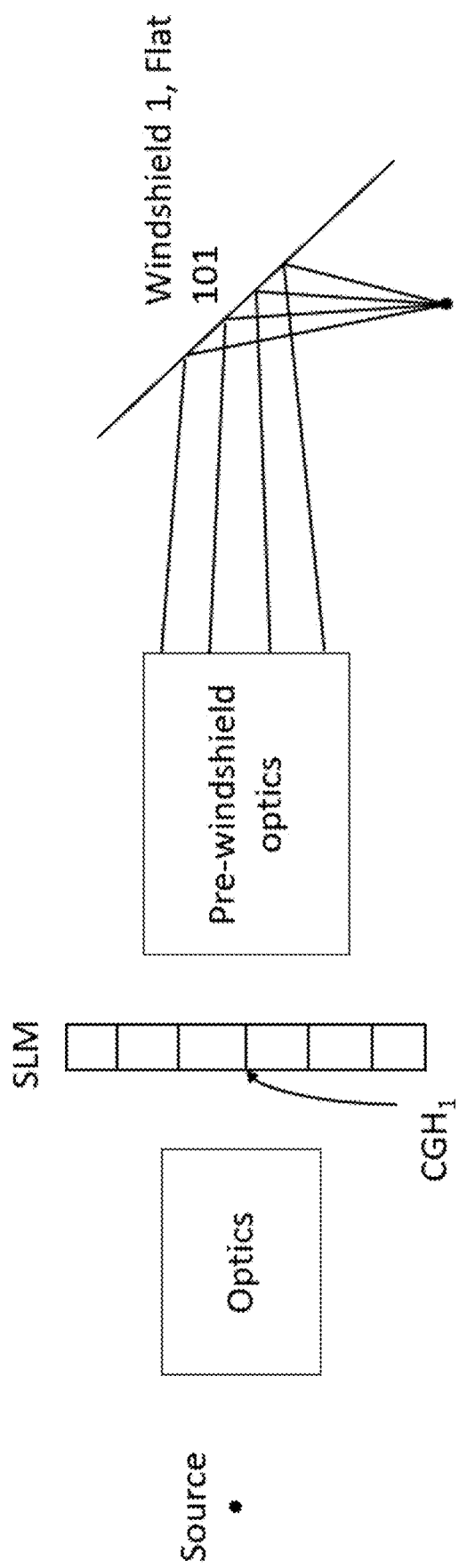
FIG. 11a demonstrates a HUD system where CGH is computed such that a diffraction-limited exit pupil forms for a flat windshield according to the present invention.
Figure 11B:
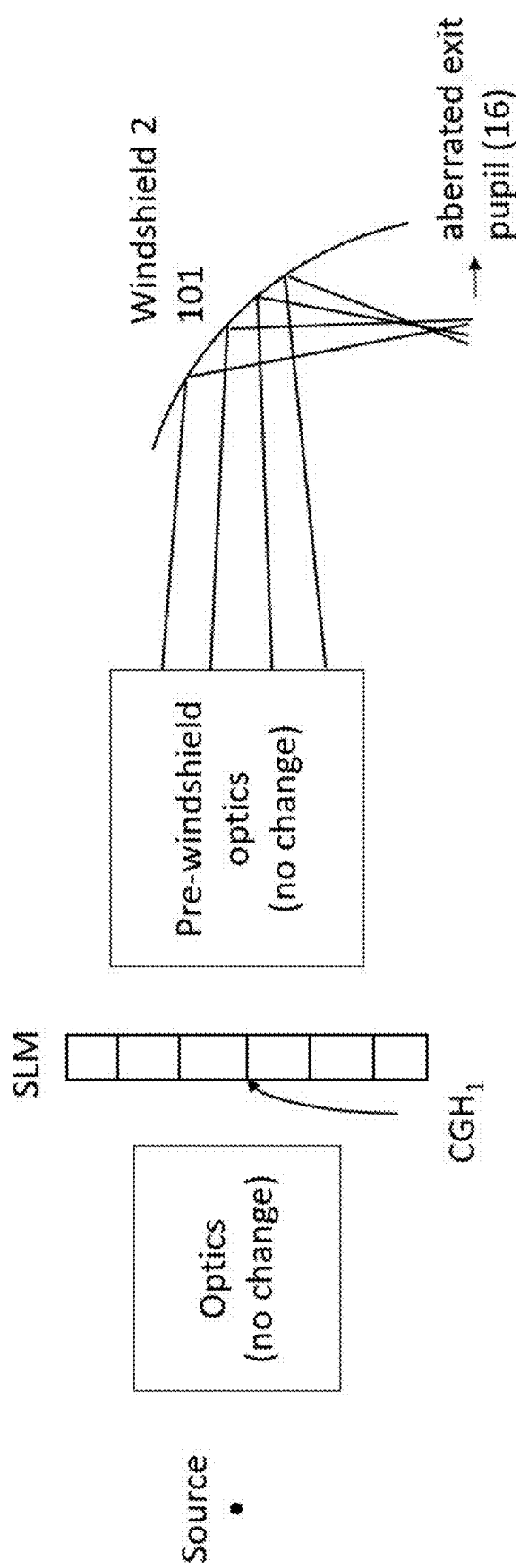
FIG. 11b demonstrates a HUD system where a CGH computed assuming a flat windshield forms an aberrated exit pupil when the actual windshield is curved.
Figure 11C:
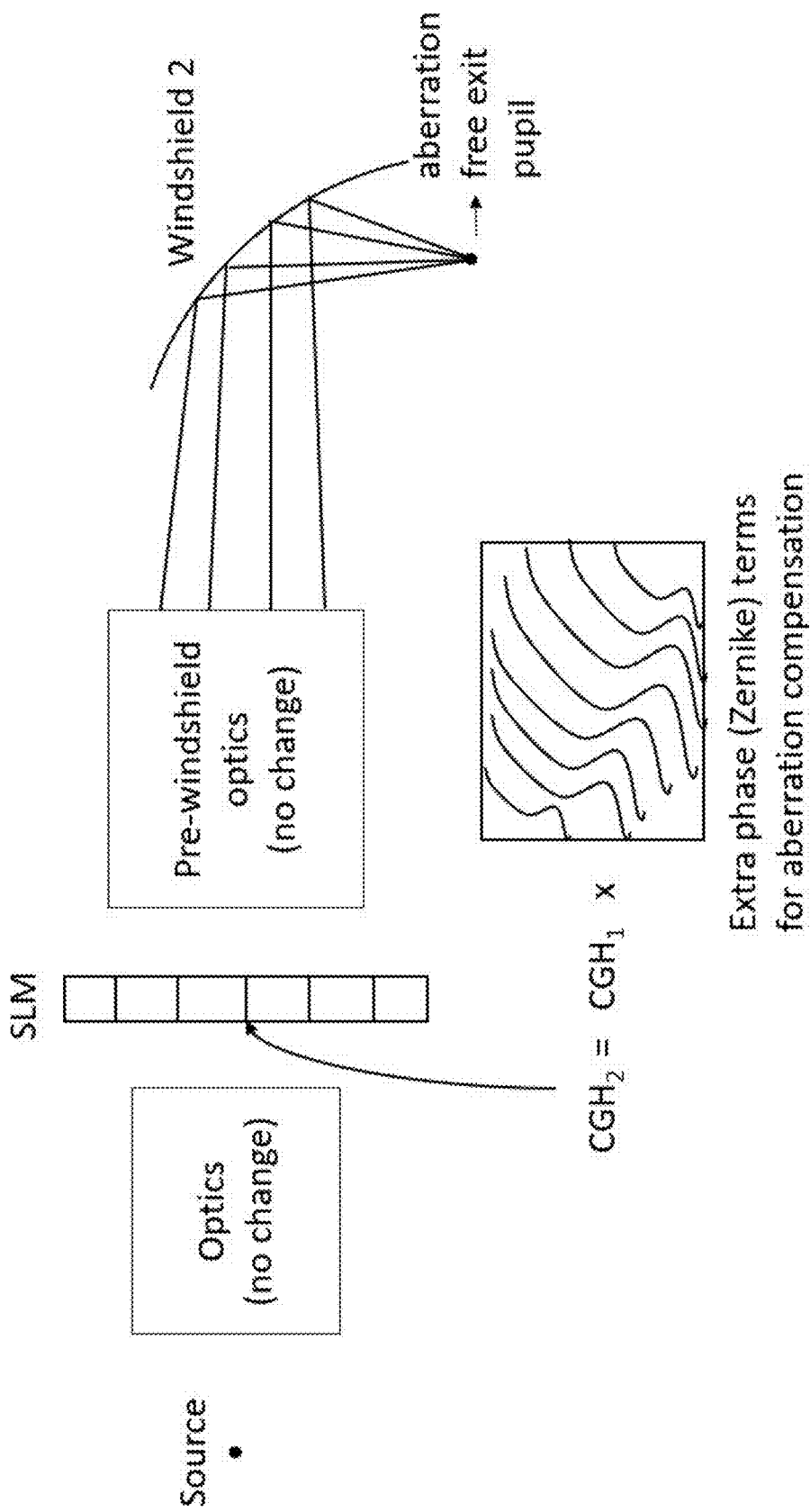
FIG. 11c demonstrates a HUD system where aberrations of exit pupil are compensated by modifying the CGH.

A holographic HUD (10) can compensate for hardware modifications in a system merely with changes in computational procedure, without additional hardware changes. FIG. 11a, illustrates case 1 for a HUD system designed for a flat windshield (101). The CGH is computed such that a diffraction limited exit pupil (16) forms on the exit pupil plane. (17) Case 2 is illustrated in FIG. 11b, where the windshield (101) is curved. Keeping the same CGH as in case 1 results in an aberrated exit pupil (16). FIG. 11c illustrates case 3, the aberrations due to curved windshield (101) in case 2 are compensated by appropriately modifying the CGH of case 1. As illustrated in FIG. 11c, multiplication with an additional phase term, which may be a Zernike function, would be sufficient to compensate for the aberrations and to obtain an aberration-free exit pupil (16). In some cases, more advanced procedures may be required, such as applying pre-distortion on the target image, and modifications of the point spread function on the SLM plane.

Figure 12:
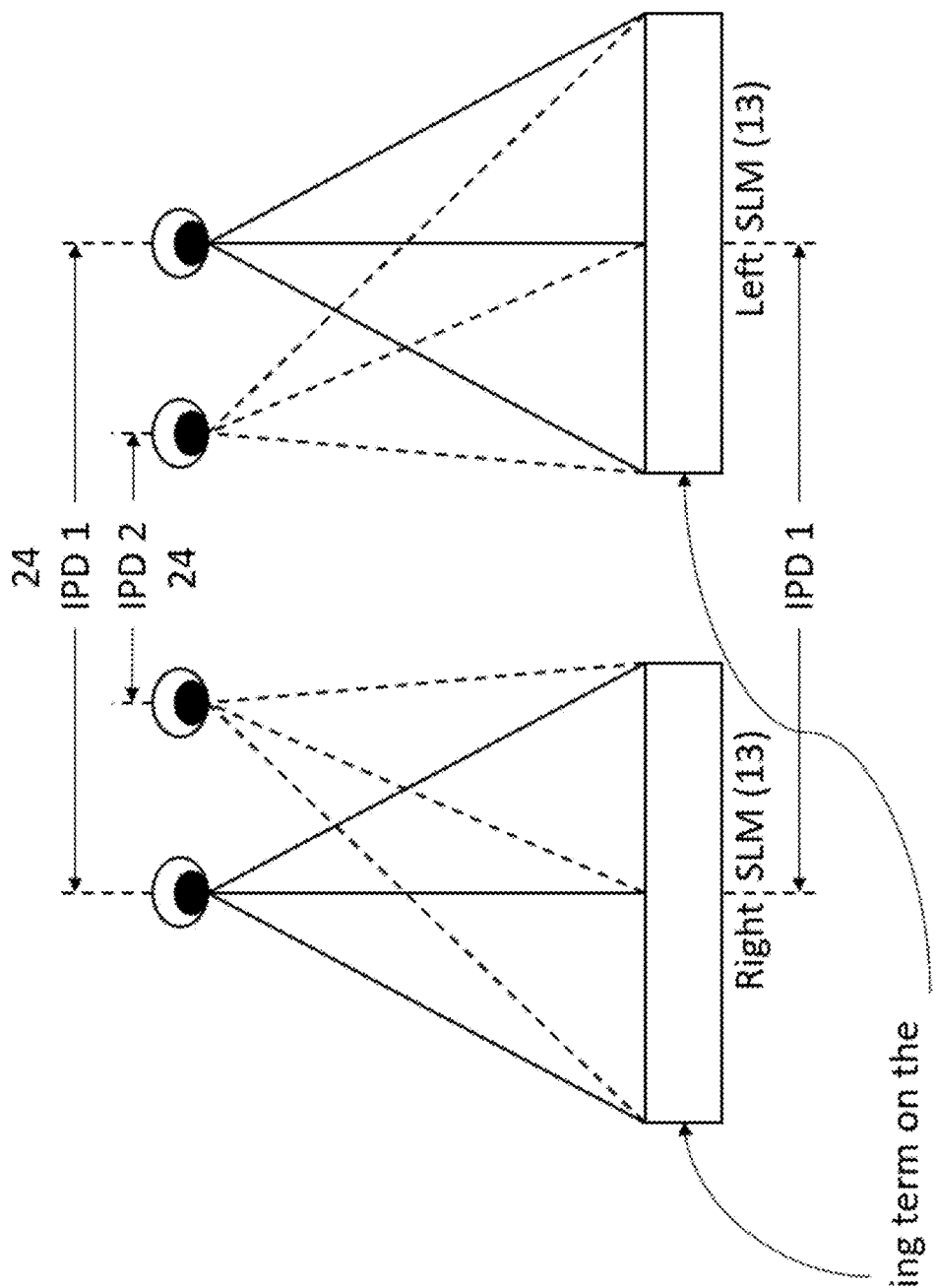
FIG. 12 demonstrates interpupillary distance (IPD) accommodation for different instances thereof.
Figure 13A:
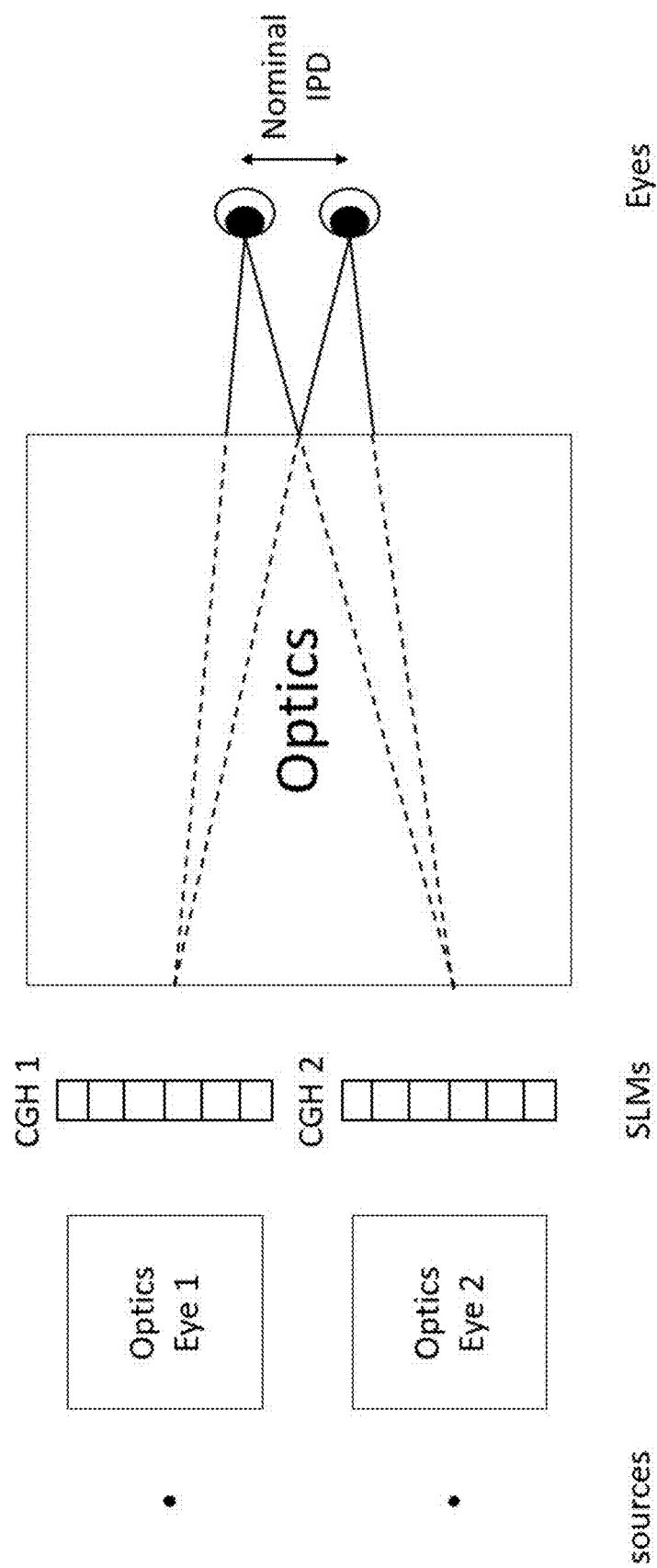
FIG. 13a demonstrates a HUD system with a nominal interpupillary distance.
Figure 13B:
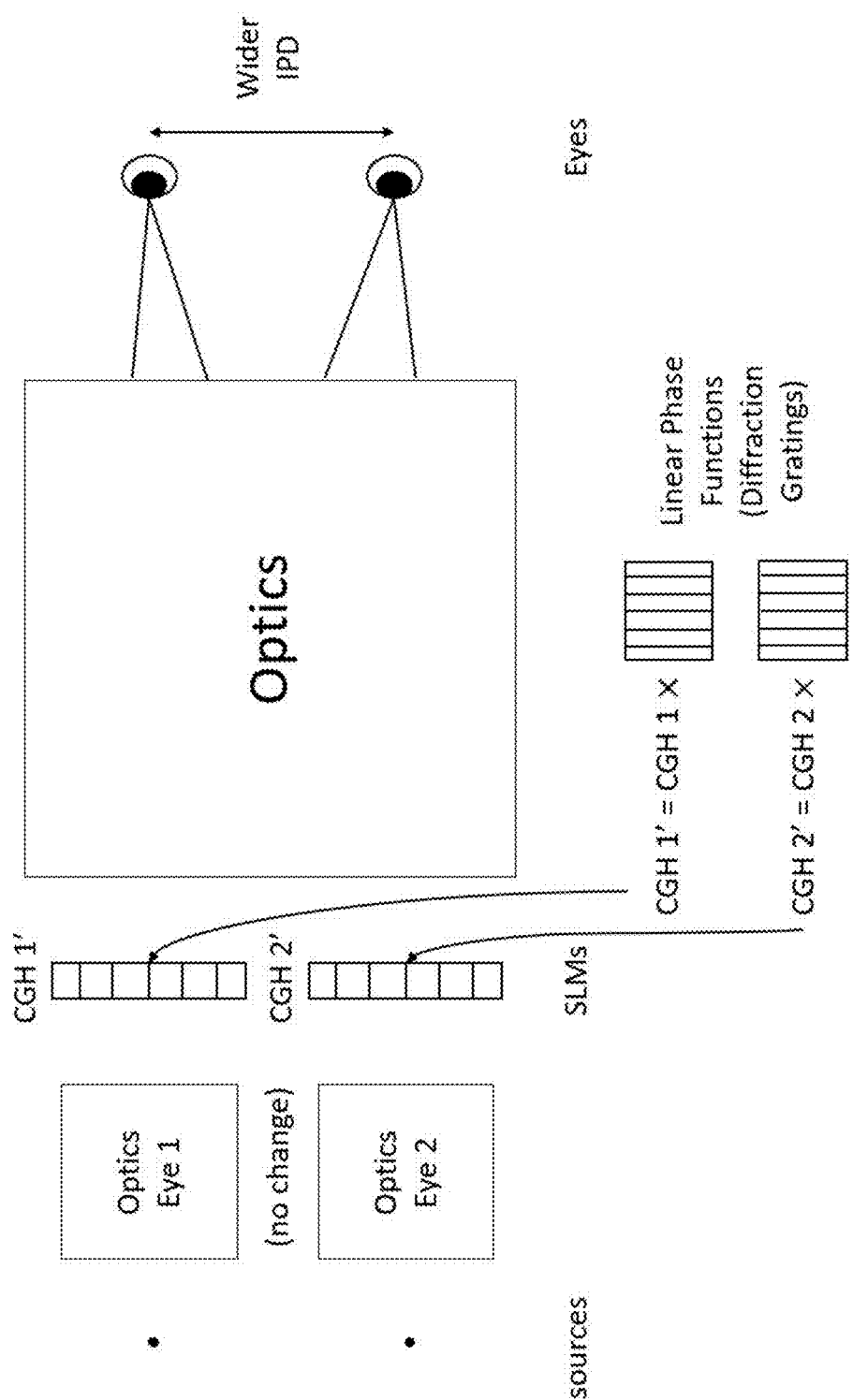
FIG. 13b demonstrates a HUD system with a wider interpupillary distance compensated with diffraction gratings in CGH computation.

Referring to FIGS. 12 and 13, the holographic HUD (10) system can provide software based IPD adjustment by modifying the CGH computation. FIG. 13a shows a system with a predefined nominal IPD (24). As illustrated in FIG. 13b, when the CGHs generating the nominal IPD (24) are altered appropriately, the IPD value may be changed. The simplest way of steering the exit pupil (16) location on the exit pupil plane (17) is to multiply a CGH with a linear phase term that would cause an additional angular deflection on the SLM (13) plane. In some cases, such as when the virtual image (105) plane is conjugate to the SLM (13) plane, this simple solution may be sufficient. In other cases, merely using linear phase terms may result in aberrations forming on the exit pupil plane (17), and distortions appearing on the observed virtual image (105). In such cases, additional Zernike polynomial terms may be included on top of the linear phase terms.

Figure 14A:
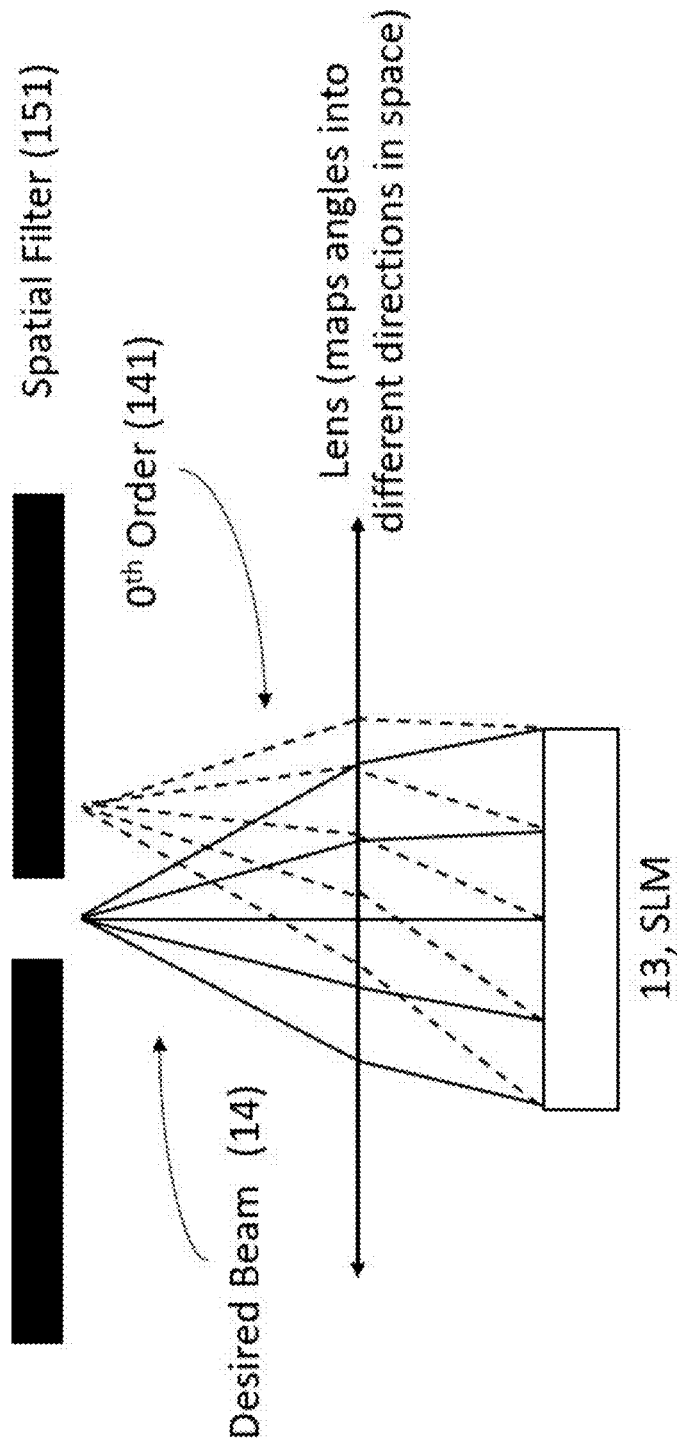
FIG. 14a demonstrates the spatial filter and mapping lens for mapping angles into different spatial directions.
Figure 14B:
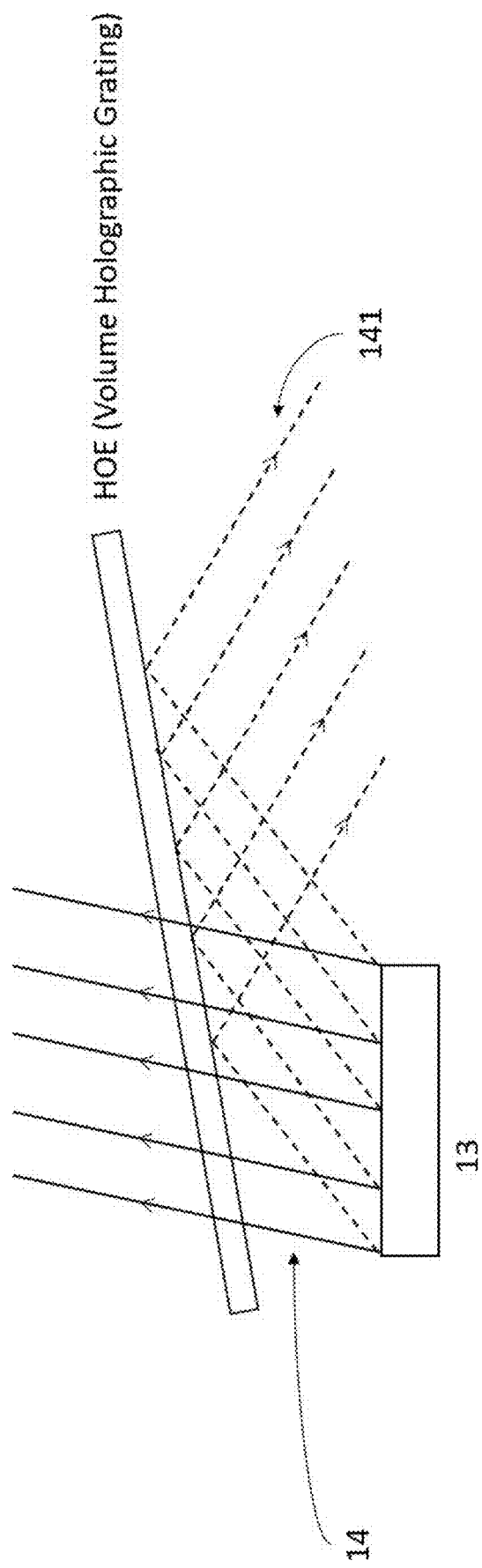
FIG. 14b demonstrates the volume holographic grating for angle manipulation into different spatial directions.
Figure 14C:
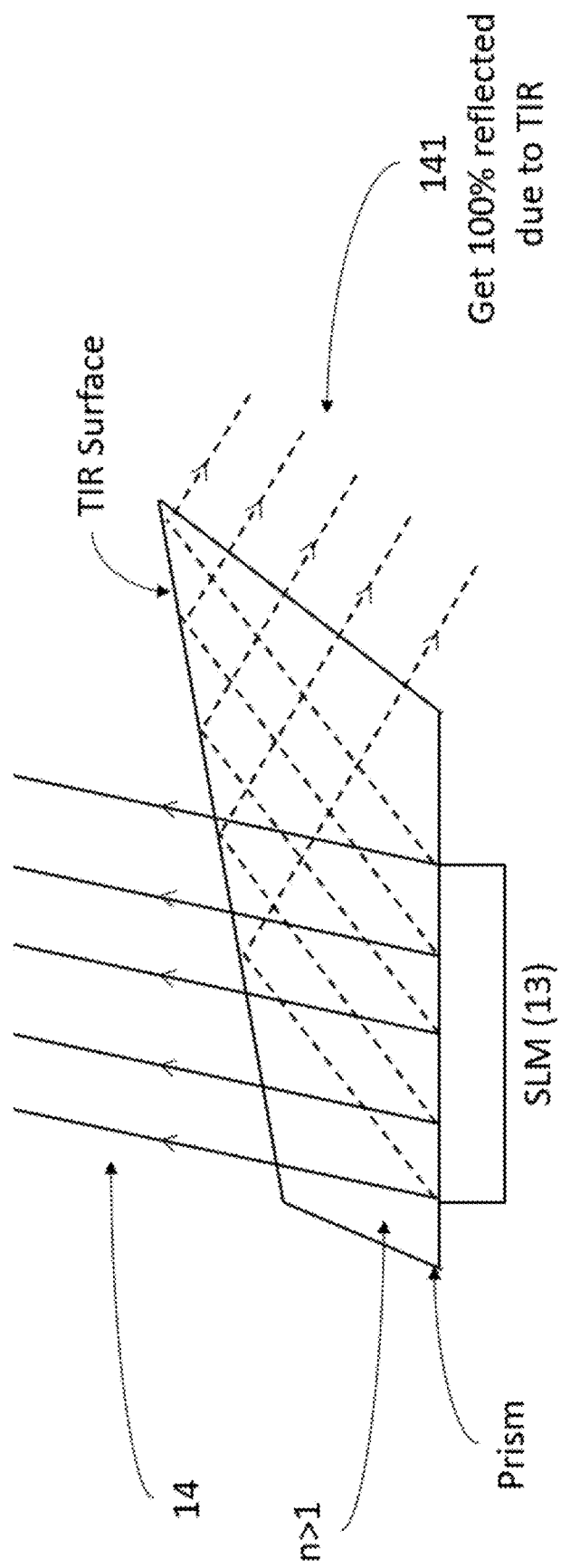
FIG. 14c demonstrates the prism with n>1 for angle manipulation into different spatial directions.

FIG. 14 illustrates various optical filters (15) to eliminate undesired beams (141) while letting desired modulated beam (14) that carries the image information. Undesired beams (141) can be the unmodulated 0th order beam, higher diffraction orders due to the pixelated nature of the SLM, and undesired conjugate beam and undesired replicas of the desired modulated beam (14) created by the pixelated and imperfect nature of the SLM (13). FIG. 14*a* shows the spatial filter (151) based method of elimination. FIG. 14*b* illustrates the use of holographic optical elements (HOE), which transmit the desired modulated beam (14) while reflecting the undesired beams (141). FIG. 14*c* illustrates separation of the desired modulated beam (14) using a prismatic element and total internal reflection (TIR) at one interface to separate beams with different propagation directions. Undesired beams (141) can be 100% reflected due to TIR.

Figure 15:
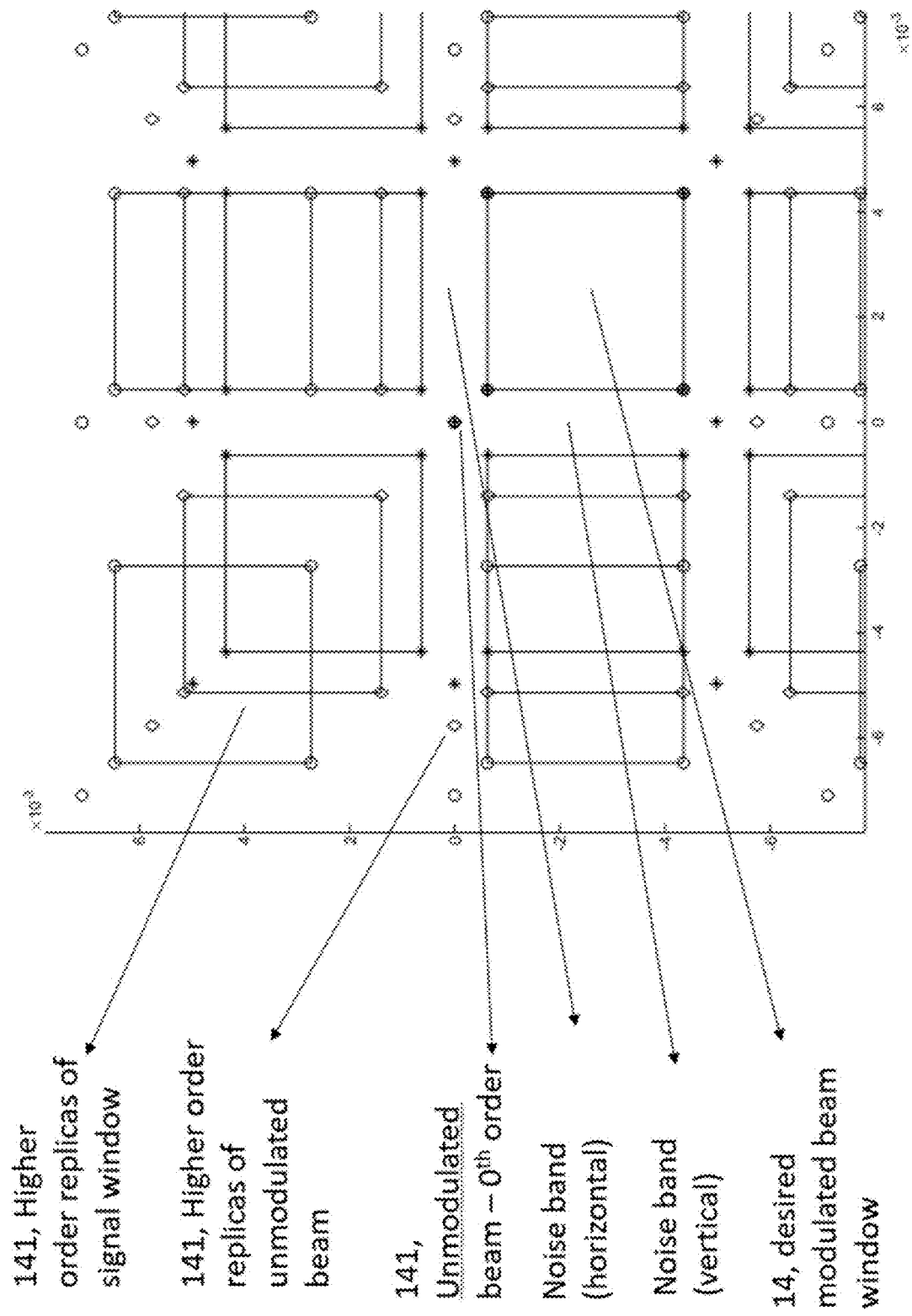
FIG. 15 demonstrates the spatial relationship between unmodulated beams, a desired modulated beam window along with higher order replicas thereof in addition to vertical and horizontal noise beams.

FIG. 15 illustrates the desired modulated beam (14) and the undesired beams (141) for different illumination colors. The light distribution at the spatial filter (151) or the Fourier filter plane for a holographic display system. When the SLM (13) is illuminated with red, green, and blue color light sources (11). The corresponding patterns appear at the following boxes in the figure: Red is in boxes with circle corners, green is in boxes with diamond corners, and blue is in boxes with star shaped corners. The desired modulated beam (14) window or the signal window can not have an arbitrary size. Its size is at most equal in both directions to the distance between 0th and 1st orders of the unmodulated blue beam. Some embodiments may allow for both vertical and horizontal noise bands. In some embodiments, no vertical noise band is placed (signal window occupies the whole width from 0th to 1st of unmodulated blue beam) and only horizontal noise bands can be allowed, and vice versa.

Figure 16A:
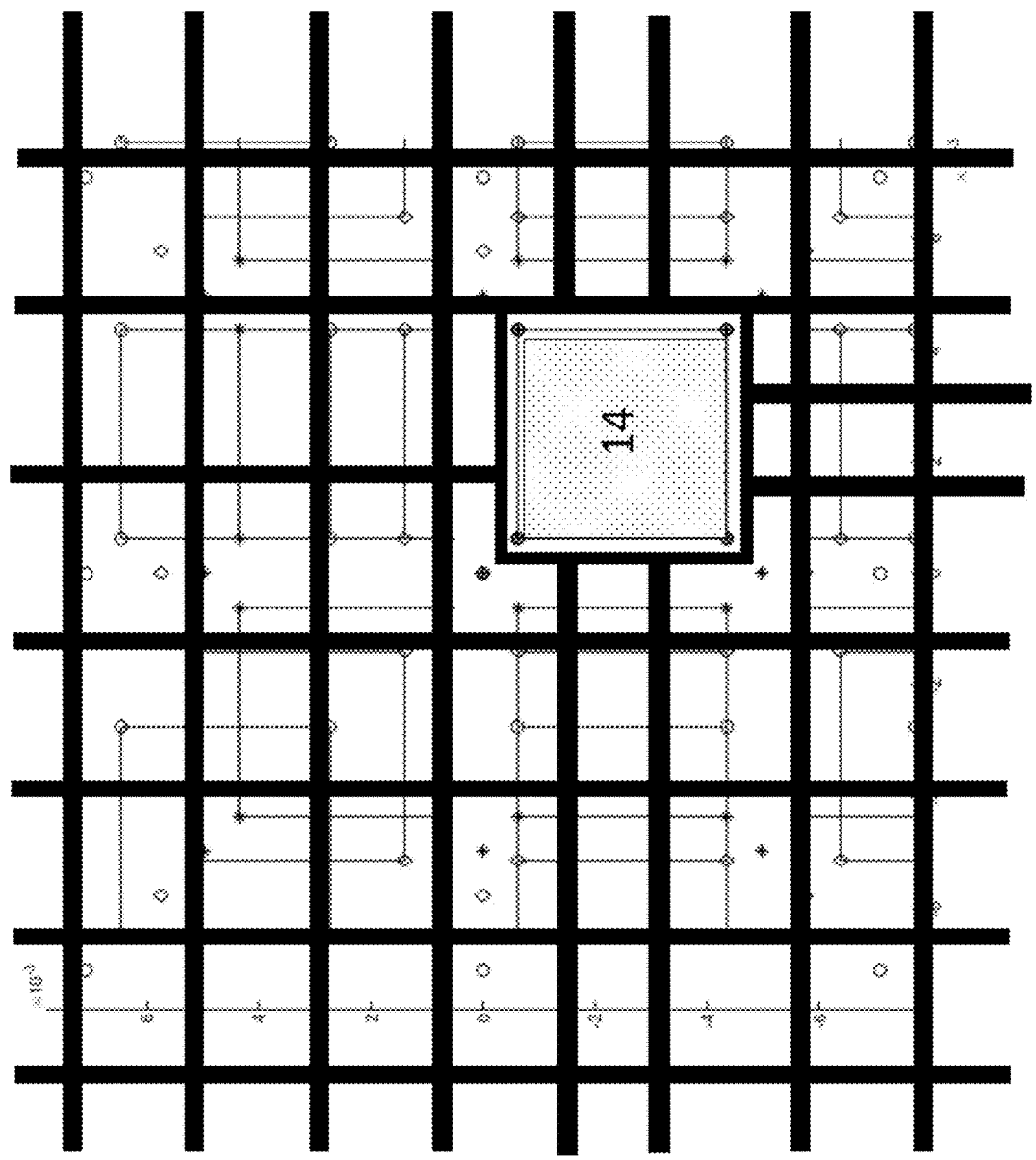
FIG. 16a demonstrates the use of a spatial filter combined with the desired modulated beam window.

In some embodiments, the Fourier filter is an aperture which selects one of the quadrants around the 0th unmodulated beam as illustrated in FIG. 16*a*. The desired modulated beam (14) or the signal beam is placed within the indicated rectangular aperture. If the eye pupil also matches the size of the corresponding exit pupil (16) on the exit pupil plane (17), this system can merely support a fixed exit pupil (16) location, that can not be further steerable with modification on CGHs such as multiplying with linear phase terms. If the eye pupil size is much smaller than the size of the corresponding exit pupil (16) on the exit pupil plane (17), the actual desired modulated beam (14) carrying the signal information would be steerable within the signal window with CGH modifications. However, such configurations will result in poor utilization of the available space bandwidth product (SBP) of the SLM (13), where SBP a measure for the information capacity an optical system possesses and proportional to the number of pixels in the SLM (13). Efficient utilization of SBP requires the instantaneous exit pupil (16) size not to be much greater than viewers eye pupil size.

Figure 16B:
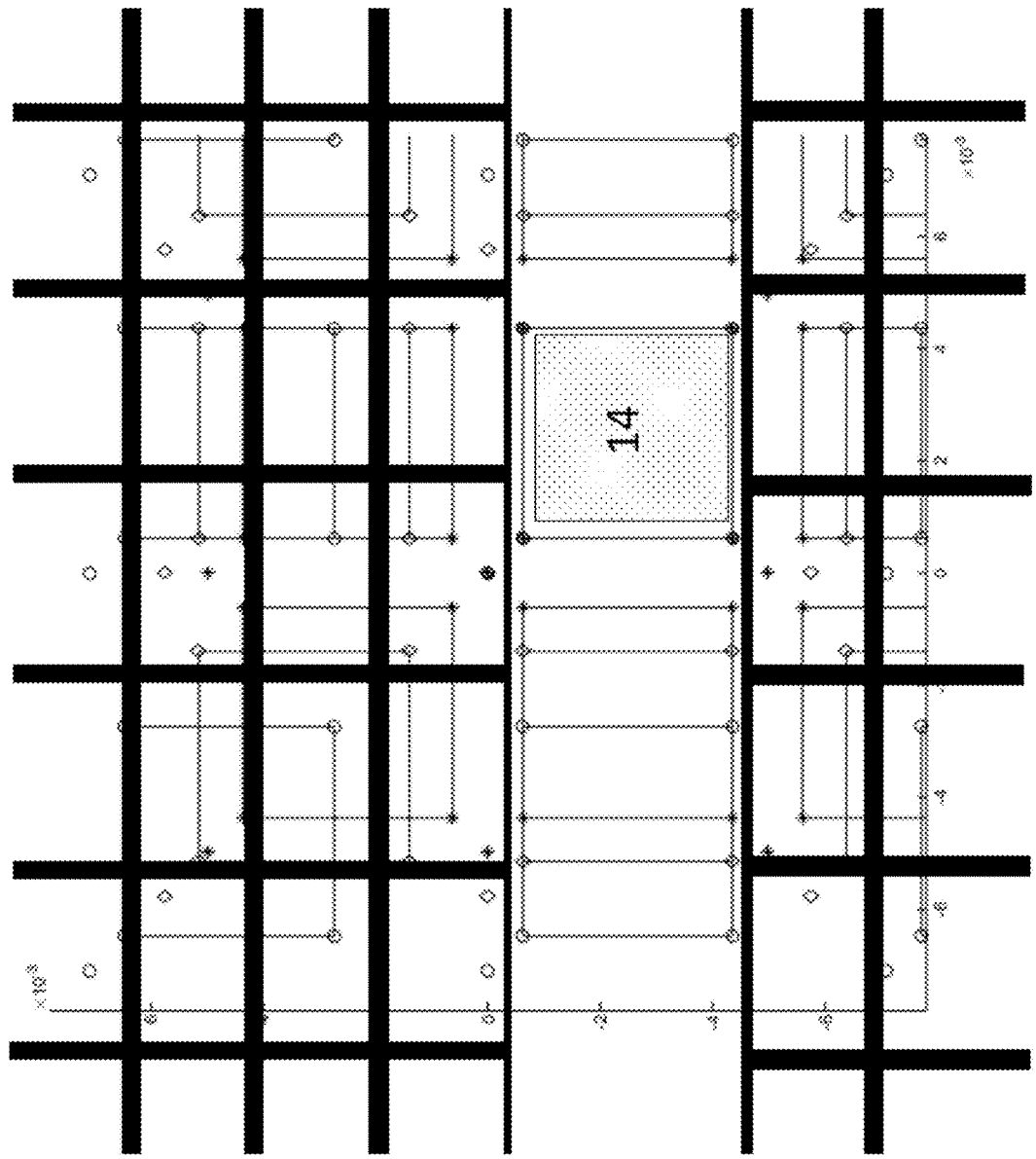
FIG. 16b demonstrates spatial filter in the form of a horizontal band.
Figure 16C:
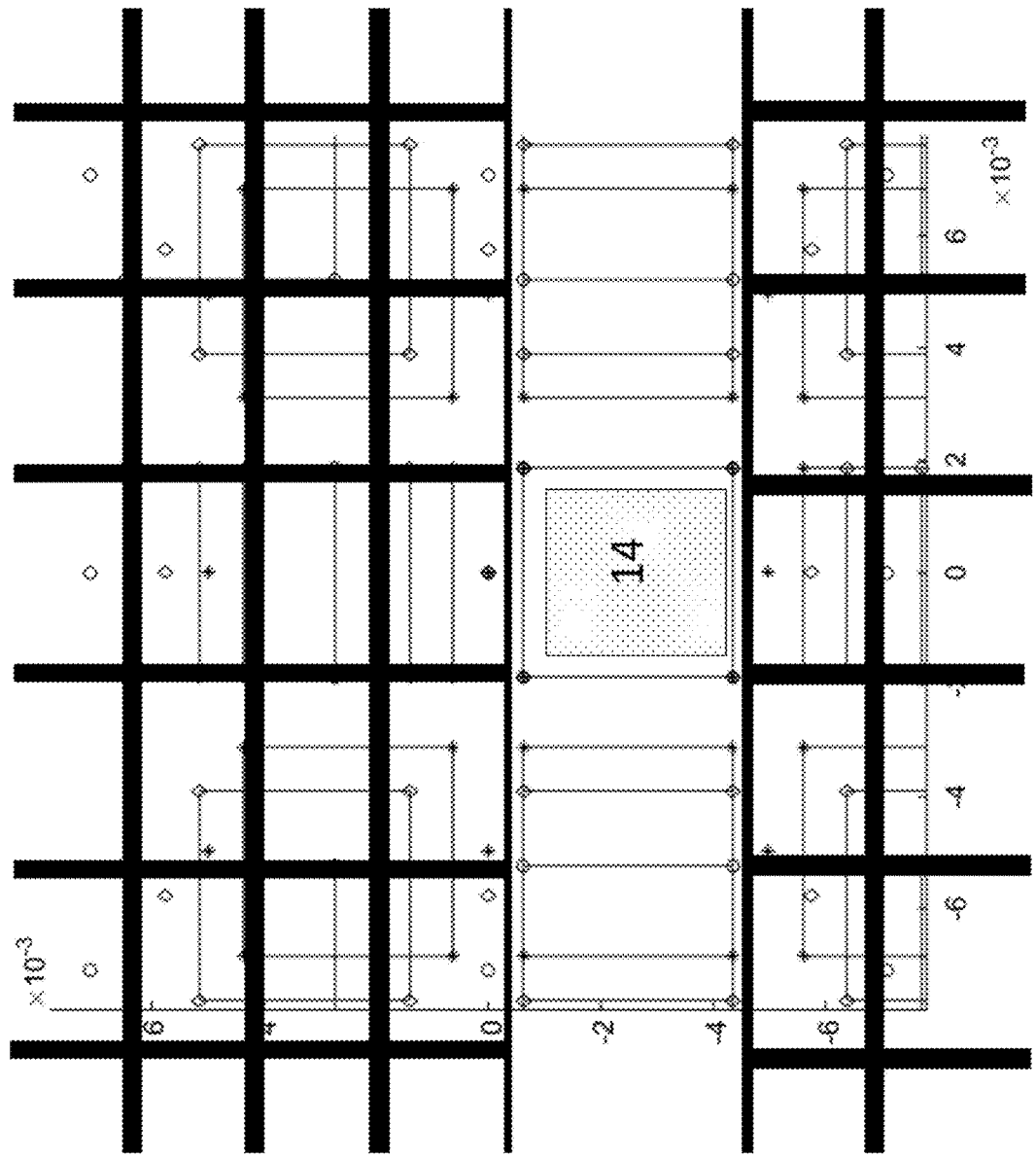
FIG. 16c demonstrates spatial filter utilization in the form of a horizontal band with the desired modulated beam window steered to a different location within the horizontal aperture thereof.

Referring to FIG. 16*b*, in some embodiments, the Fourier filter is an aperture in the form of a horizontal band that lies below (above) the 0th order unmodulated beam. Although part of the region can be uniquely addressed and designed as the desired modulated beam (14) window, this window can be steered within the horizontal band as in FIG. 16*c*. If the user's eye (21) pupil acts as a second spatial filter (151) on the exit pupil plane (17) that selects only the desired modulated beam (14) window and filter out the higher order replicas and noise, the system is able to deliver a ghost-free image and noise free image. In some embodiments, all the computational noise can be placed outside the passband of the spatial filter (151), and hence all the noise will get blocked. Coupled with the head tracking system (19) and pupil tracker, such spatial filtering provides an opportunity for software based IPD adjustment and exit pupil (16) steering. This software based exit pupil (16) steering can be used in combination with the optical steering apparatus (18) such as acousto-optic scanners (36) and steering mirrors (23).

Figure 17A:
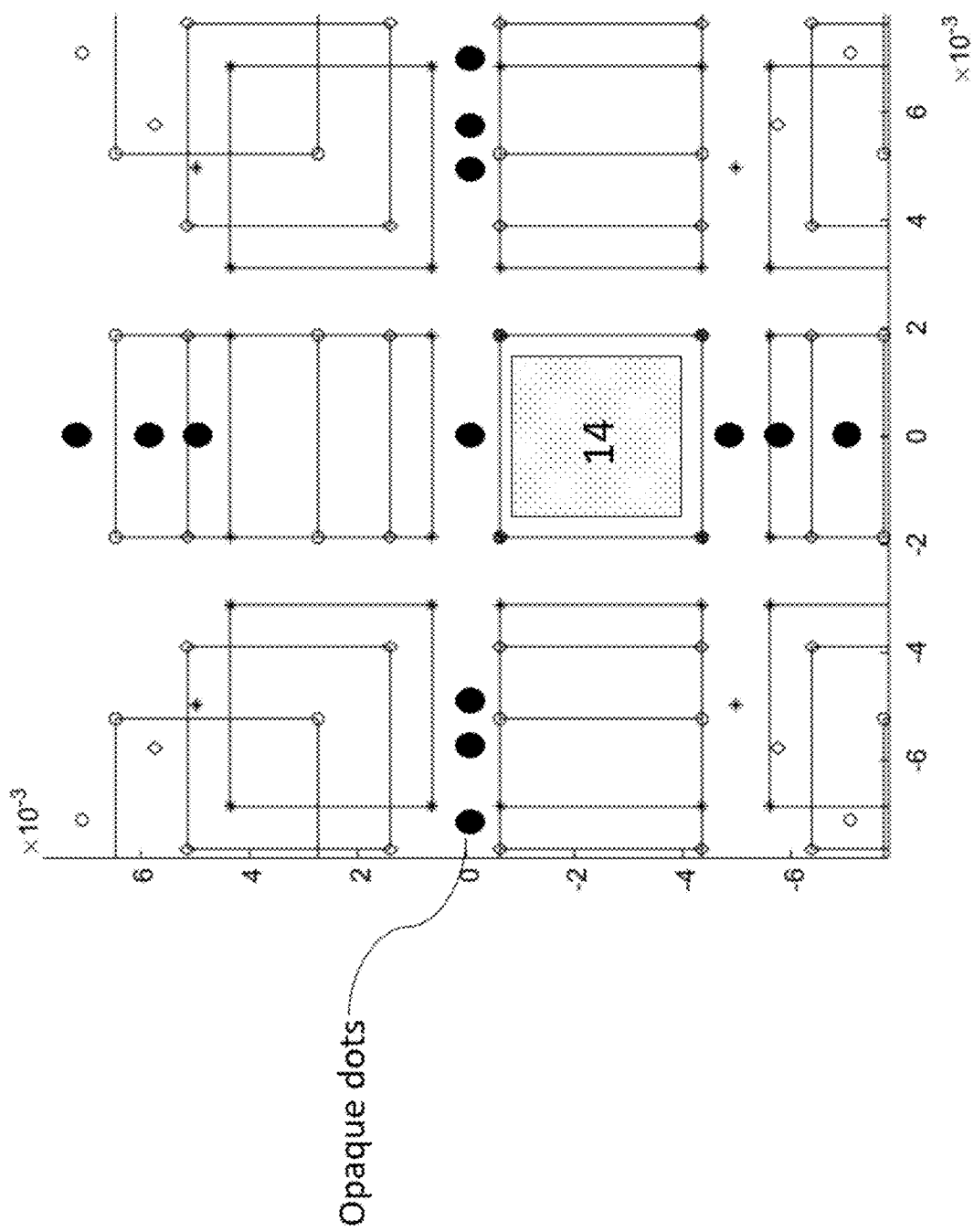
FIG. 17a demonstrates an example of the utilization of opaque dots for blocking unmodulated beams.
Figure 17B:
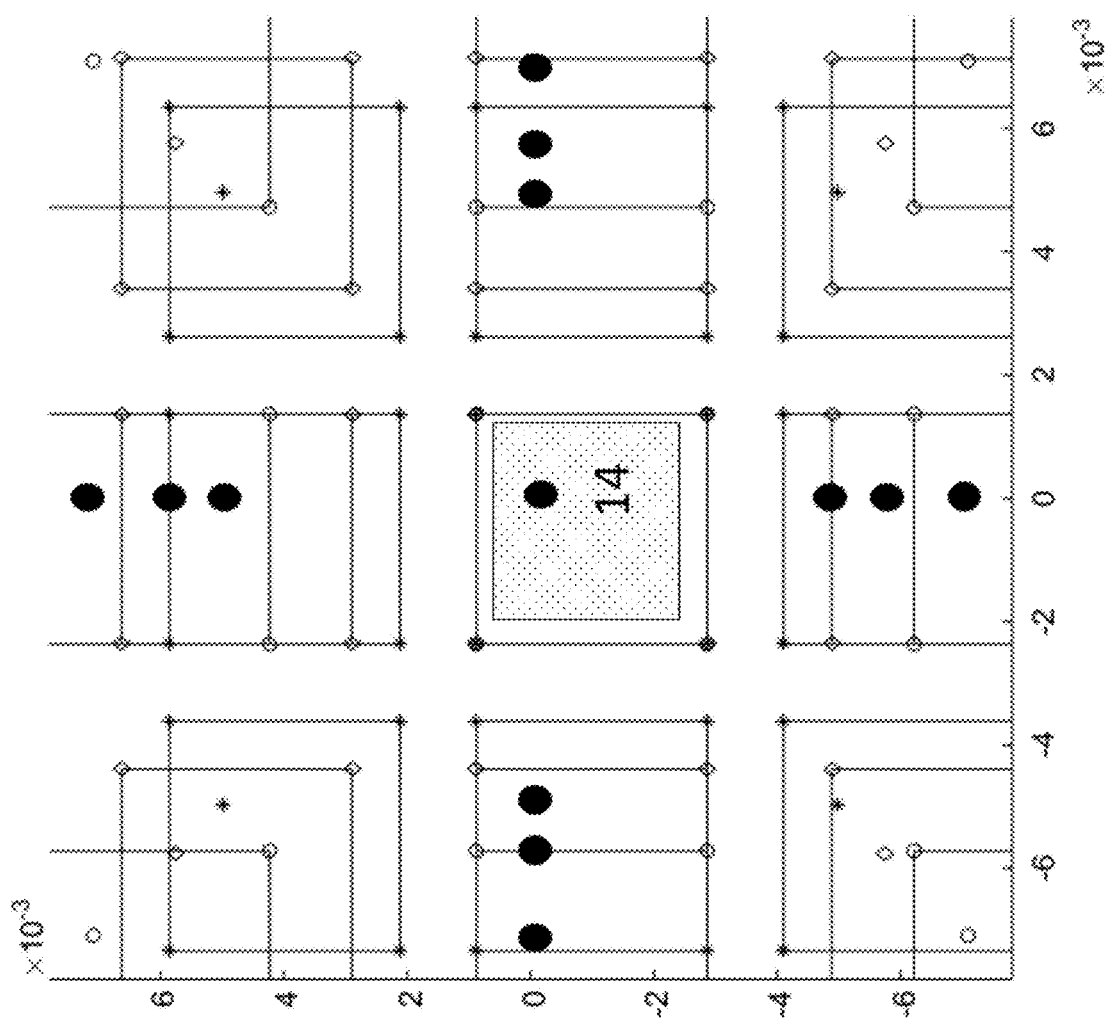
FIG. 17b demonstrates another example of the utilization of opaque dots for blocking unmodulated beams FIG. 18 demonstrates a top perspective view of a steering mirror.

In some embodiments, the spatial filter (151) consists merely of opaque dots blocking the unmodulated beams. Coupled again with a pupil tracker, and again assuming that the viewer's pupil acts as a secondary spatial filter (151) to select the desired modulated beam (14) window (or signal window) and eliminate higher order replicas and noise, this configuration gives the ability for exit pupil (16) steering over a much larger area across the exit pupil plane (17), theoretically, without any limit. But in practice, the brightness decays rapidly as the signal window gets away from the 0th order unmodulated beam. Limiting the location of the signal window within the first orders of the unmodulated beam (the 4 quadrants around the 0th unmodulated beam) is practically a reasonable choice. As long as the signal beams do not concentrate significant energy on the opaque dots, the presence of the opaque dots will be unrecognizable by the viewer. Referring to FIG. 17*b*, which shows a case where the desired modulated beam (14) window or the signal window is steered to a location containing the opaque dots. As long as the eye pupil of the user fits within the signal window, and energy is not concentrated on the opaque dot, the opaque dot will be equivalent to a minor obscuration on the pupil of the user, which will be unrecognizable if it is much smaller than the user's eye (21) pupil.

FIG. 18 shows a 2-axis rotatable steering mirror (23) structure using two electromagnetic actuated motors attached at the backside of the mirror. The configuration is designed to minimize the inertia of the steering mirror (23) structure. In an alternative embodiment, one can use a double gimbal structure. The actuator motor and its controller should be designed to provide vibration immunity.

Figure 19B:
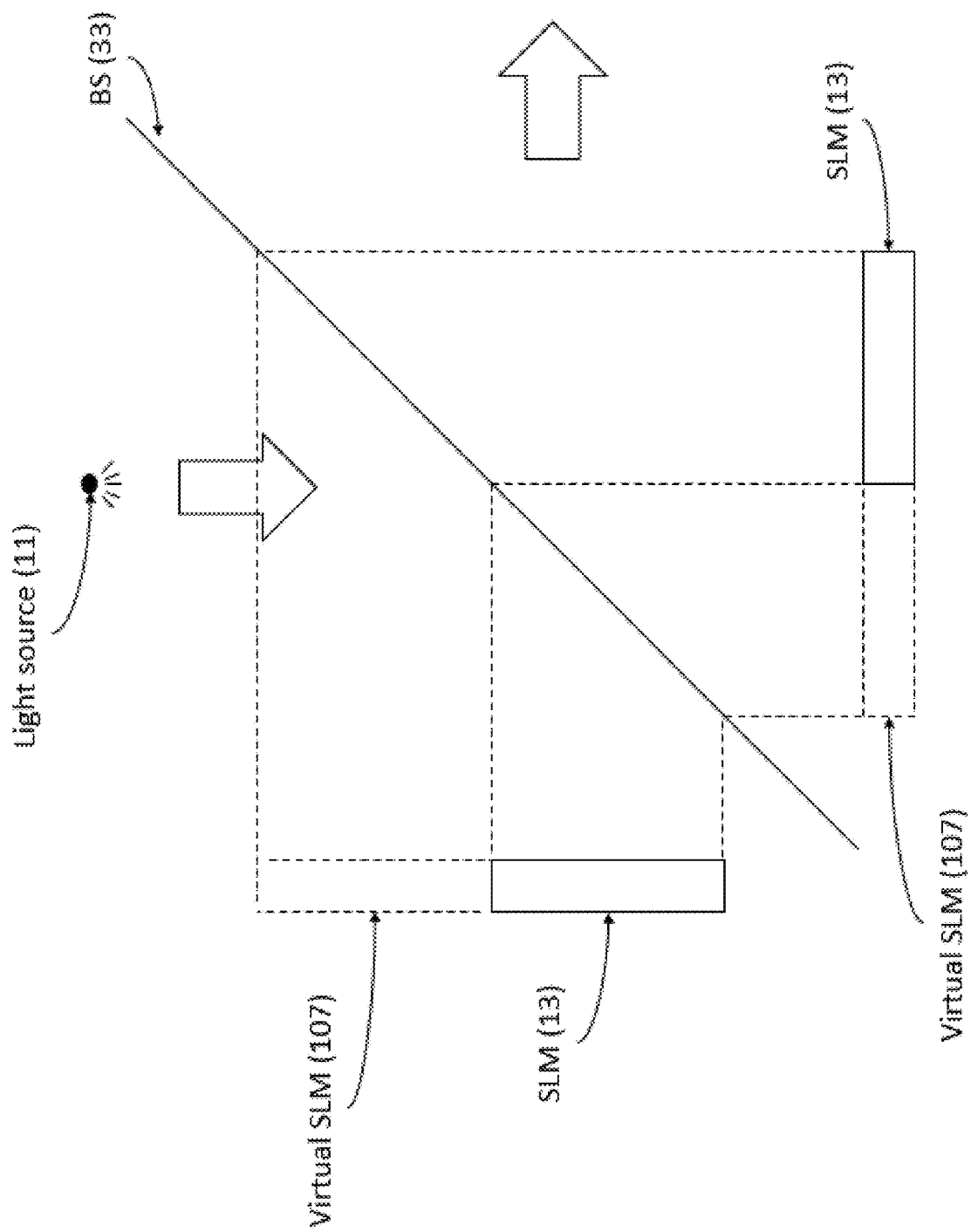
FIG. 19*b* demonstrate tiling of two SLMs using a beam splitter.

FIG. 19*a* shows SLM (13) tiling options using 1, 2, 3, and 4 SLMs (13). As illustrated in the figure, SLMs (13) can be tiled horizontally and vertically and their orientation can be adjusted based on the aspect ratio of SLMs (13). SLM tiling can be seamless or some inter-SLM spacing might be introduced between the active areas of two adjacent SLM (13). FIG. 19*b* shows tiling of two SLMs, side by side, without any seam in between using a beam splitter (BS) (33). SLM position can be adjusted to introduce overlap, no overlap, or seamless tiling of the SLM (13) and the virtual SLM (107). Distance of each SLM (13) to the BS (33) can be adjusted to remove any phase errors between tiled SLM (13) and the virtual SLM (107). BS (33) can be a polarizing BS and quarter wave plates can be used in front of the SLMs to change the polarization of the light for light efficient combination.

Figure 20:
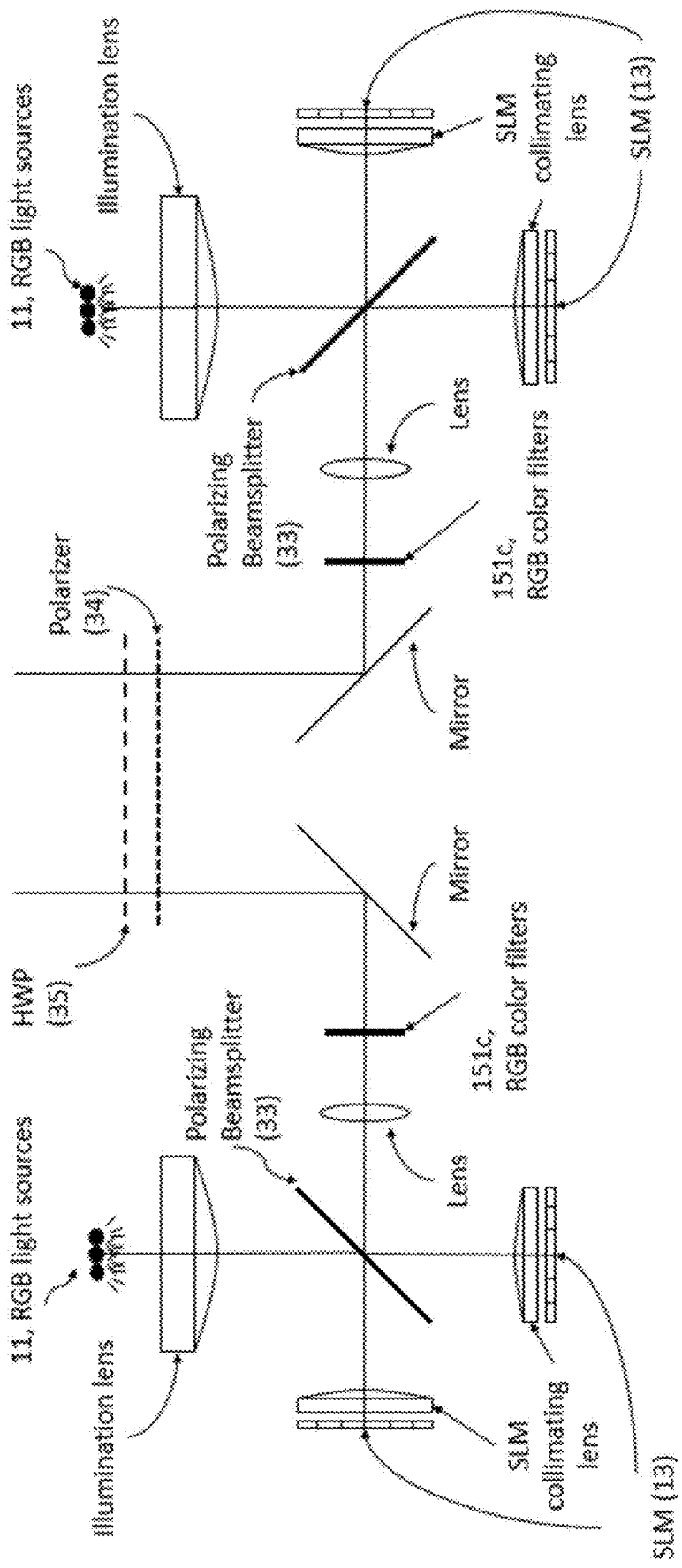
FIG. 20 demonstrate two-eye optical module using color filters and polarization components.

Referring to FIG. 20, each eye optical module consists of collimation and focusing lenses. Light source (11) with different color, i.e., red, green, and blue (RGB) light sources, can be spatially separated or combined with a beam combiner. RGB color filters (151*c*) at different spatial locations can be introduced at the spatial filter (151) plane to separate out the desired modulated beam (14) and undesired modulated beam (141) for each color. Polarization optical components such as polarizer (34) and half wave plate (35) can be used to select the desired polarization and rotate the polarization in the desired direction before the beam is sent to the subsequent optics and the windscreen (101).

Figure 21A:
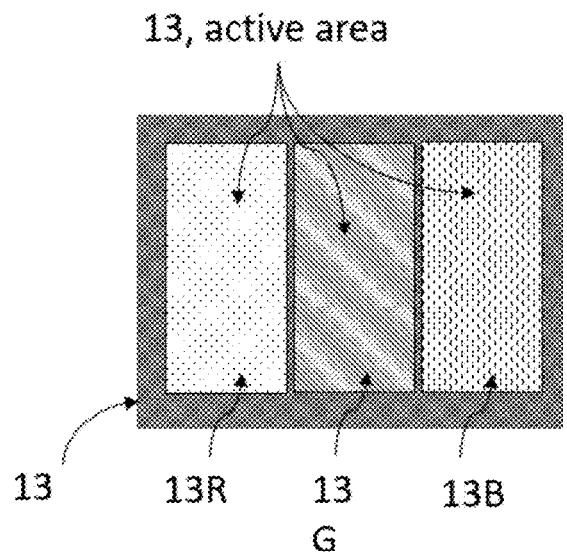
FIG. 21*a* demonstrates an example of various sub-sections of the SLM dedicated to different color content.
Figure 21B:
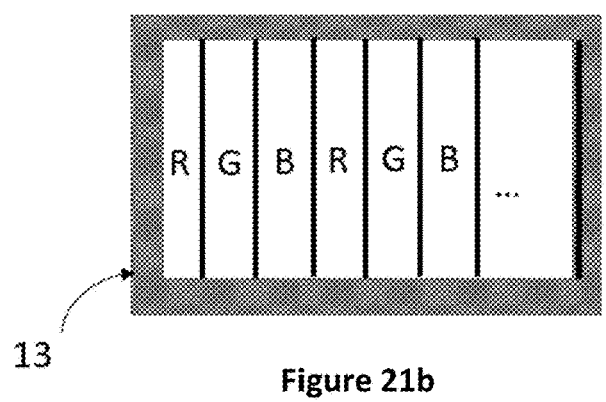
FIG. 21*b* demonstrates an example of various sub-sections of the SLM dedicated to different color content.
Figure 21C:
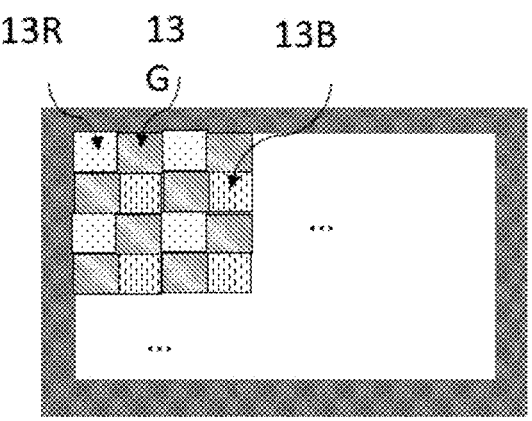
FIG. 21*c* demonstrates an example of various sub-sections of the SLM dedicated to different color content.

Referring to FIG. 21, SLM (13) has an active area with active pixels. Subsections of the SLM (13) referred to as 13R, 13G, 13B can be dedicated to different sub holograms. Such subsections can have color filters or color filtering can be performed at the spatial filter (151) using the red, green, and blue color filters at spatial filter plane (151c). Subholograms can be large sections or can be at pixel level as illustrated in FIG. 21 a, b, and c. In another embodiment, color filters can be replaced with a pixelated liquid crystal shutter device that is electrically controlled to open and close different pixels to let or block light in different sections of the spatial filter (151) plane.

Figure 22A:
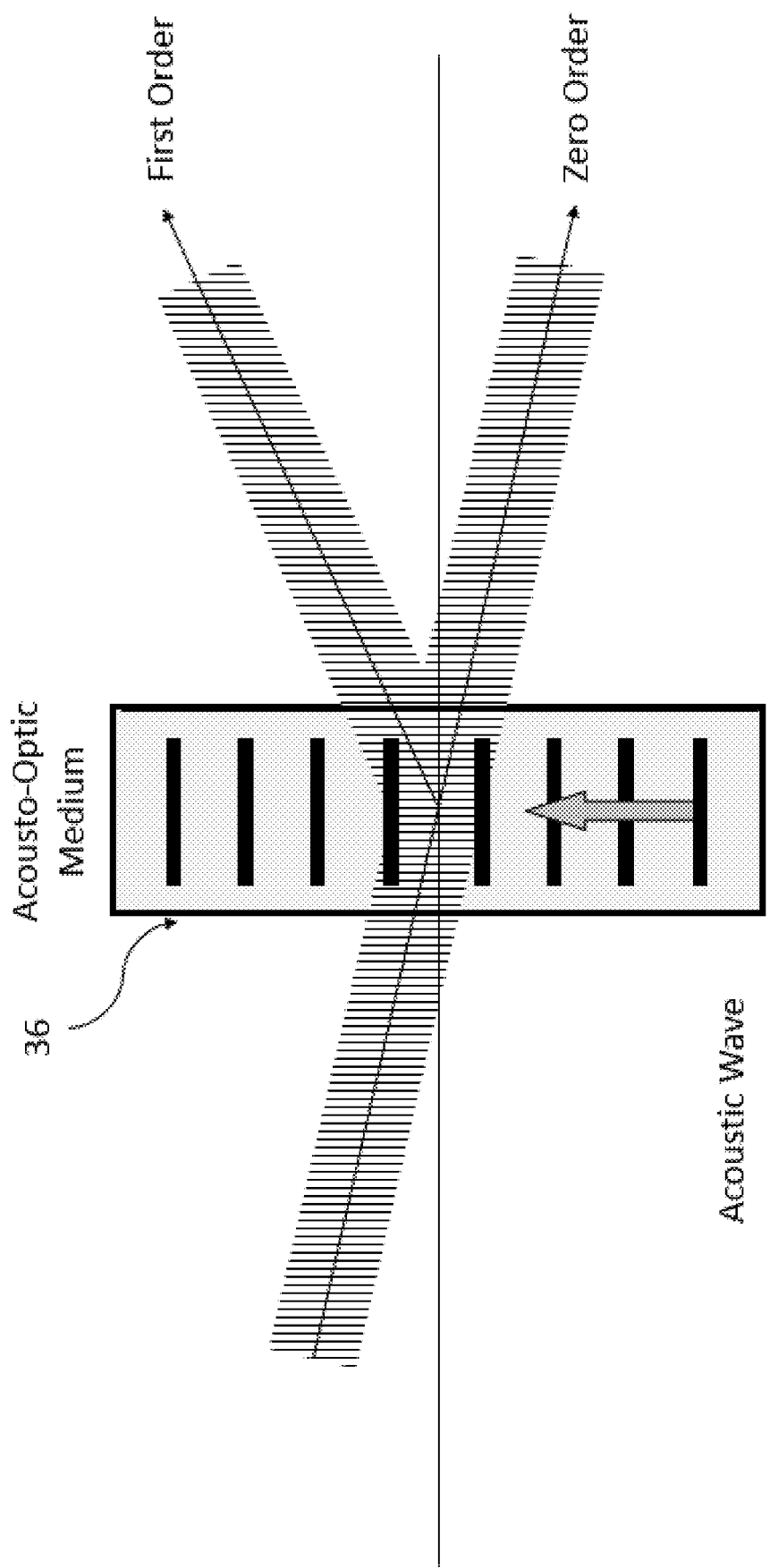
FIG. 22*a* demonstrates and example of use of acousto-optic scanner for optical beam steering and spread of the deflection angles when an acousto-optic scanner is operated with a chirped frequency input.
Figure 22B:
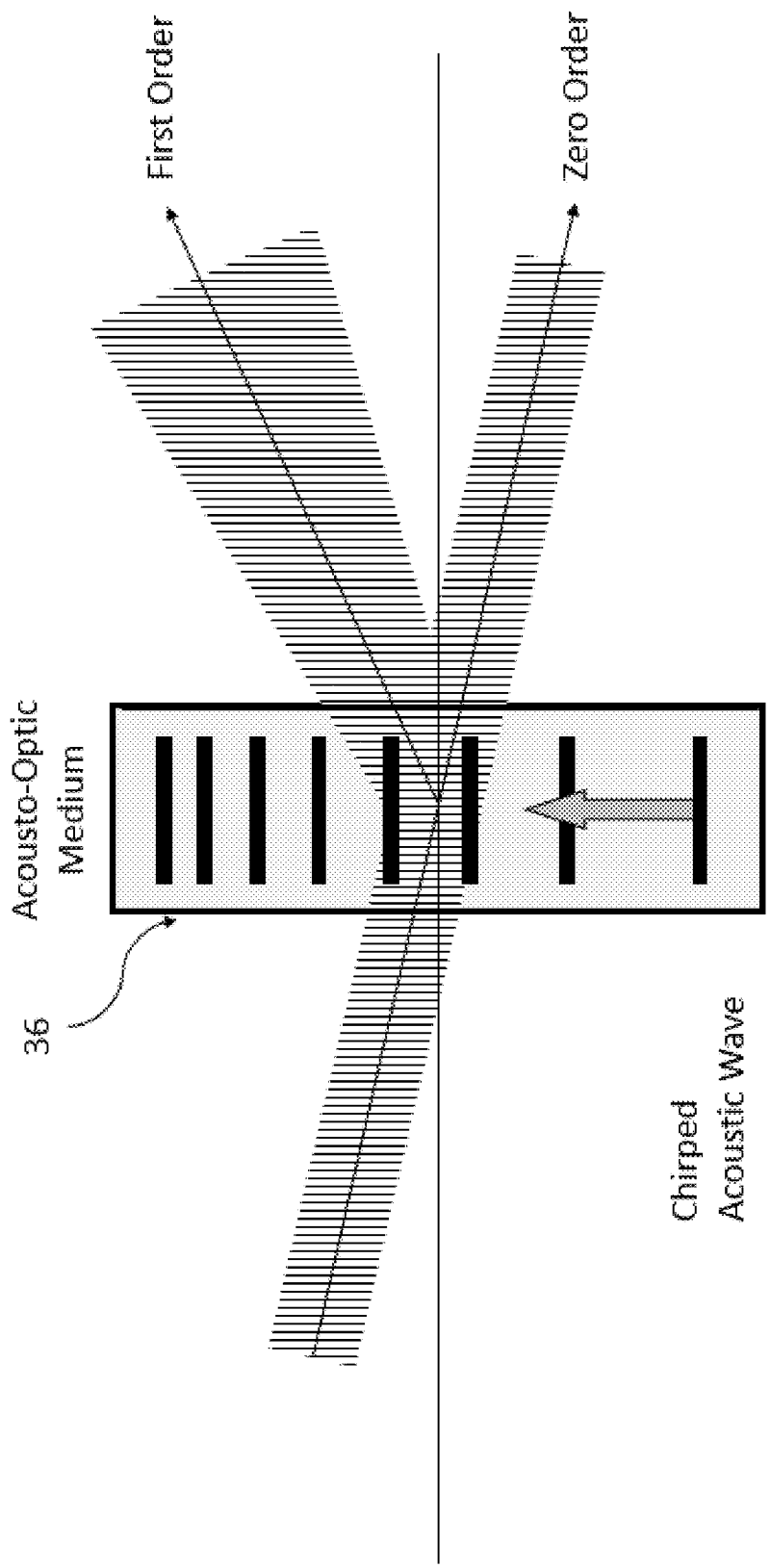
FIG. 22*b* demonstrates another example of use of acousto-optic scanner for optical beam steering and spread of the deflection angles when an acousto-optic scanner is operated with a chirped frequency input.

Referring to FIG. 22, an acousto-optic scanner (AOS) (36) can be used to steer the optical beam and act as an optical steering apparatus (18). AOS can steer the beam in different directions depending on the frequency of the signal applied to the acousto-optic medium. By changing the frequency, first order angle can be changed. As shown in FIG. 22b, it is possible to steer the beam in a range of angles by applying a chirped acoustic wave to the acousto-optic medium.

Figure 23:
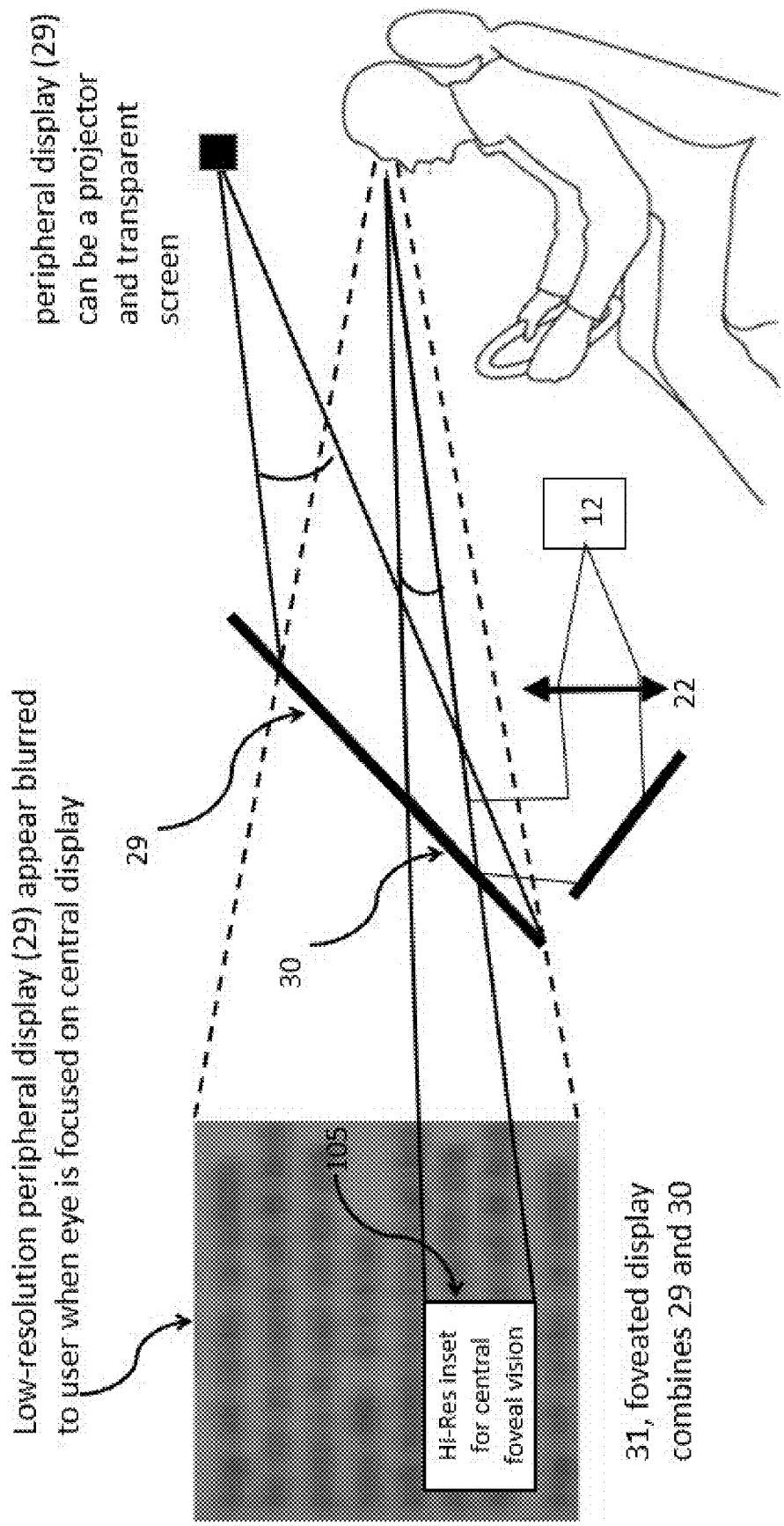
FIG. 23 demonstrate use of holographic central display and peripheral display surrounding the central display.

Referring to FIG. 23, a foveated display (31) combines central display (30) with small FOV and peripheral display (29) with large FOV. Peripheral display (29) might be formed using a projector that illuminates a transparent holographic screen attached to the windscreen (101). Since the peripheral display (29) image appear on the windscreen (101), user's eye (21) need to focus on the windscreen (101) in order to see a sharp image for the peripheral display (29) content. When the user's eye (21) is focused on the virtual image (105) provided by the central display (30) or the holographic projection module (106) in this system, the peripheral display (29) image appears blurred as illustrated in the figure.

Referring to FIG. 24, when user's head is straight and within the eyebox, exit pupil (16) for left eye and right eye illustrated with the crosses and user's eyes (21) are well aligned. When the user's head tilts while using the display, exit pupil (16) may no longer be aligned with both of the user's eye (21). As illustrated in FIG. 24(b), exit pupil (16) for one eye can be moved vertically by changing the location of the window that contains the desired modulated beam (14). Such software-based adjustment by adding a grating phase term on the CGH effectively compensate for the head tilts. Amount of vertical movement required in the spatial filter (151) plane is the amount of vertical shift required at the exit pupil plane (17) divided by the optical magnification of the system. As discussed above, horizontal adjustments of the exit pupil (16) allow for IPD (24) adjustments.

Figure 25A:
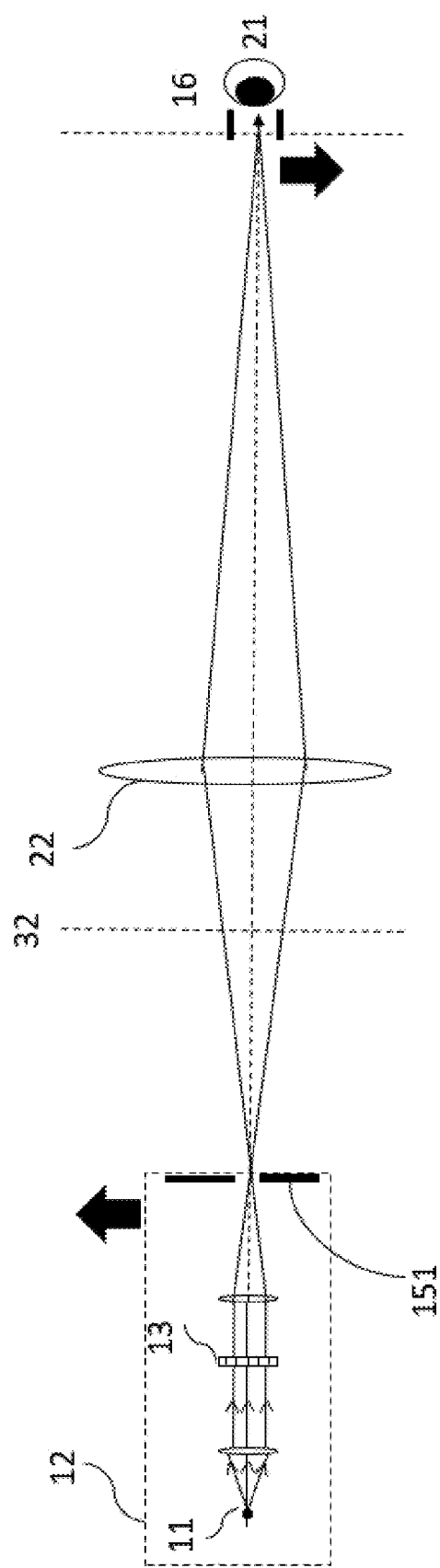
FIG. 25*b* demonstrates another example of moving the exit pupil vertically for one eye to compensate for head tilt FIG. 26 demonstrate use of prisms for changing the magnification of the imaging system in one axis.
Figure 25B:
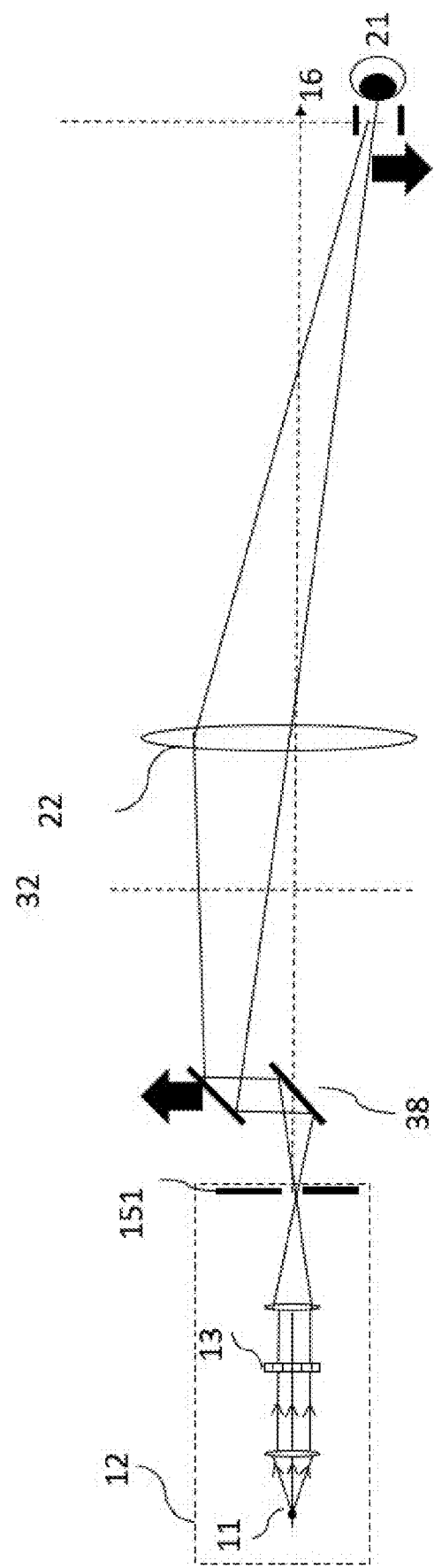

Referring to FIG. 25a, head tilt can be compensated by moving one eye light module (12) relative to the other eye light module (12). FIG. 25b demonstrate moving the exit pupil (16) vertically for one eye using two fold mirrors, where one of the mirrors is movable as illustrated. Vertical up motion of the fold mirror results in the vertical down movement of the corresponding exit pupil (16).

Figure 26:
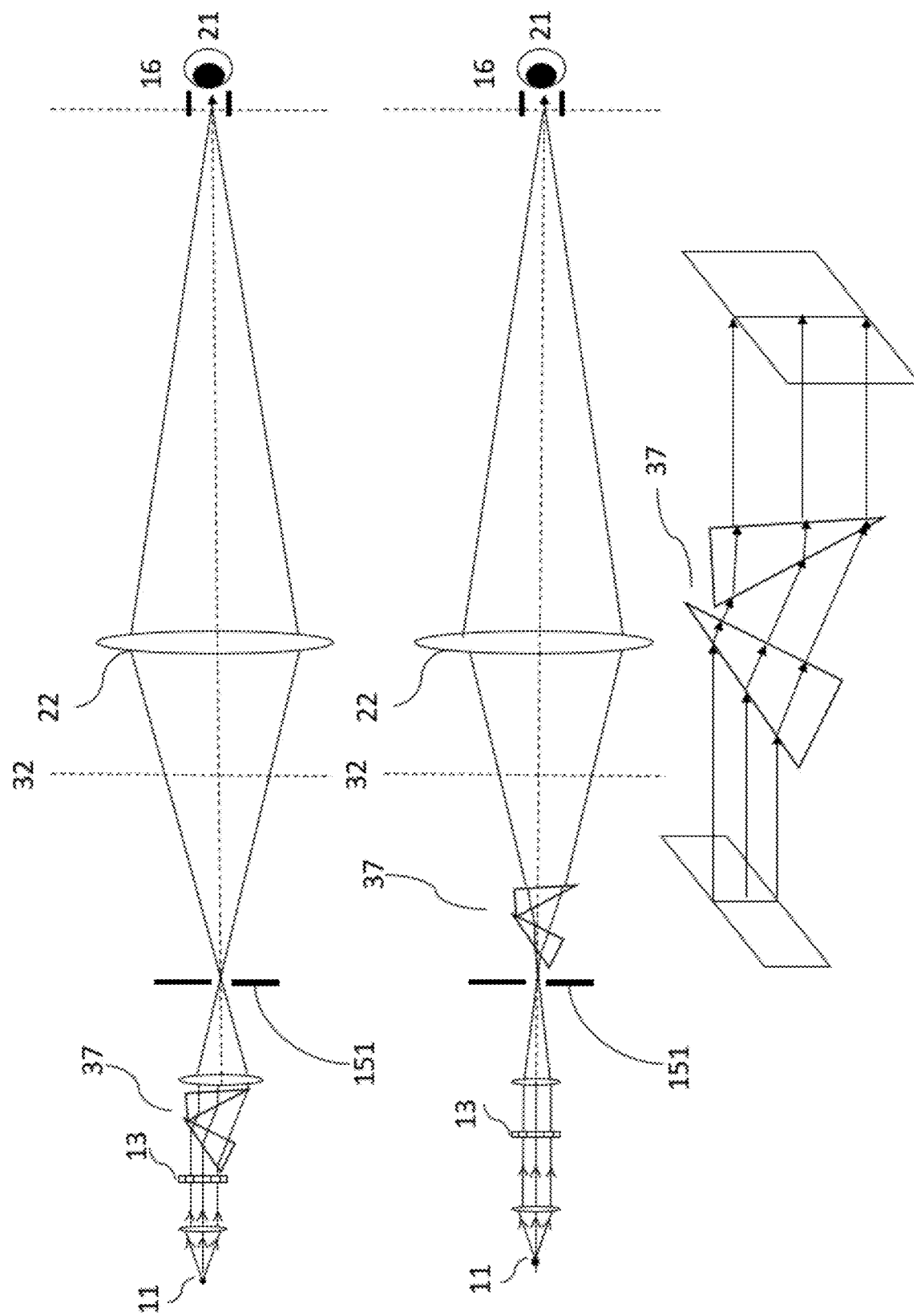

Referring to FIG. 26, a magnifying prism pair (37) can be used to change the magnification of the imaging system in one axis. Such a magnification change results in effectively changing the aspect ratio of the display. As an example, two 16:9 aspect ratio SLMs (13) can be tiled horizontally to achieve 32:9 aspect ratio. Using a magnifying prism pair (37) to increase the vertical magnification by 1.2 times results in an aspect ratio of 32:10.8 or approximately 3:1.

In one aspect of the present system, a head-up display device (10) comprising at least one light module (12) wherein each light module (12) consists of at least one light source (11) and at least one spatial light modulator (13), which display computer generated holograms to spatially modulate the light incident from said at least one light source (11) is proposed.

In another aspect of the present system, said at least one light module (12) form desired modulated beam (14) that carries holographic image information and undesired beams (141); wherein undesired beams (141) are blocked with optical filter (15); while the desired modulated beam (14) transmitted through the optical filter (15) form at least one exit pupil (16) on an exit pupil plane (17) for viewing the head-up display content; and wherein the exit pupils (16) created by each of the at least one light module (12) are steerable across the exit pupil plane (17) using an optical steering apparatus (18).

Head-up display (10) in this system is defined to include augmented reality display use cases which are not head-worn or head-mounted. All the embodiments referred to in this system is therefore not limited to head-up displays and can be used adapted for use in wearable and near eye display system, holographic TV, holographic projection display system, or any other display system.

In a further aspect of the present system, said optical steering apparatus (18) comprises a mechanical scanner.

In a further aspect of the present system, said optical steering apparatus (18) comprises an actuator in form of EM actuated motor, gimbal motor, step motor, a 2-axis actuator.

In a further aspect of the present system, said optical steering apparatus (18) comprises at least one acousto-optic scanner (36).

In a further aspect of the present system, said exit pupil (16) is formed using an imaging lens (22).

In a further aspect of the present system, said imaging lens (22) comprises of at least one surface with optical power consisting of reflective lens, diffractive lens, refractive lens, freeform optical elements, holographic optical elements, or a combination thereof.

In a further aspect of the present system, said exit pupil (16) is an optical conjugate of the spatial light modulator (13).

In a further aspect of the present system, two exit pupils (16) formed by the imaging lens (22) are separated by an interpupillary distance (IPD) (24) value in the range 52 mm and 75 mm.

In a further aspect of the present system, said interpupillary distance (IPD) (24) is algorithmically adjustable with CGH computation software.

In a further aspect of the present system, said device is configured to perform an aberration correction algorithm.

In a further aspect of the present system, optical steering apparatus (18) is a rotatable steering mirror (23).

In a further aspect of the present system, said device further comprises an additional steering mirror (23) which rotate the two exit pupil (16) in the exit pupil plane (17) to compensate for the head rotation of the user.

In a further aspect of the present system, said steering mirror (23) executes steering for left eye exit pupil (16) and right eye exit pupil (16) across the exit pupil plane (17) together.

In a further aspect of the present system, said steering mirror (23) is placed after spatial light modulator (13) through making the steering mirror (23) clear aperture smaller than the imaging lens (22) clear aperture.

In a further aspect of the present system, said steering mirror (23) is placed after the imaging lens (22).

In a further aspect of the present system, field-of-view provided by each of the two exit pupil (16) aligned with the two eyes of the user provide full binocular overlap at the imaging lens (22) or the steering mirror (23).

In a further aspect of the present system, said spatial light modulator (13) simultaneously generate holographic image content that are displayed at different depths to the user's eye (21).

In a further aspect of the present system, said holographic image information is 3-D and is displayed at different depths to the user's eye (21).

In a further aspect of the present system, said steering mirror (23) is placed at a plane substantially coinciding with an optical conjugate plane of a spatial light modulator (13).

In a further aspect of the present system, said steering mirror (23) is placed between the light module (12) and the imaging lens (22).

In a further aspect of the present system, said light source (11) is optical conjugate of the exit pupil (16).

In a further aspect of the present system, spatial light modulator image (25) appears at distance between 25 cm and 100 cm away from the exit pupil plane (17) towards the windshield (101).

In a further aspect of the present system, spatial light modulator image (25) appears at a distance between 100 cm and 500 cm away from the exit pupil plane (17) towards the windshield (101).

In a further aspect of the present system, spatial light modulator image (25) appears behind the exit pupil plane (17) away from the windshield (101).

In a further aspect of the present system, said spatial light modulator (13) is a phase-only device.

In a further aspect of the present system, said spatial light modulator (13) is device is a tiled array of SLMs that are combined optically.

In a further aspect of the present system, said SLM (13) spatially modulates the phase, the intensity or a combination of the incident light from the light source (11).

In a further aspect of the present system, said spatial light modulator (13) further comprises at least two sections containing color filters and wherein the SLM image (25) appear outside the viewing volume of the holograms.

In a further aspect of the present system, said light source (11) is an LED, superluminescent LED, or a laser diode.

In a further aspect of the present system, said light source (11) is a laser light source coupled to an optical fiber.

In a further aspect of the present system, said light source (11) is incident on the SLM (13) using off-axis illumination or a waveguide plate.

In a further aspect of the present system, computer-generated holograms displayed by said SLM (13) are computed such that the exit pupil (16) formed at the exit pupil plane (17) is adjusted according to the IPD (24) of the user.

In a further aspect of the present system, computer-generated holograms displayed by said SLM (13) are computed such that the exit pupil (16) formed at the exit pupil plane (17) is shifted according to the position of the pupil center of the user's eye (21).

In a further aspect of the present system, said device (10) comprises a head tracking system (19) configured to track displacement(s) of the user's head and the center positions of the user's eye (21) pupils and a processor circuitry (20) effectuating control of said optical steering apparatus (18).

In a further aspect of the present system, optical steering apparatus (18) is at least one light source (11) in a light source array (28).

In a further aspect of the present system, a pointing light source in the light module (12) forms a tracking spot (27) on user's face, wherein the coordinates of the tracking spot (27) is detected by the head-tracking system (19).

In a further aspect of the present system, optical steering apparatus (18) includes a steering mirror (23) that adjusts IPD (24), exit pupil plane (17) location in the axial direction, or vertical shift of the exit pupils (16).

In a further aspect of the present system, CGH computation algorithm is used to adjust IPD (24), exit pupil plane (17) location in the axial direction, or vertical shift of the exit pupils (16).

In a further aspect of the present system, said light source (11) is movable in response to changes in the eye pupil position tracked by said head tracking system (19).

In a further aspect of the present system, in accordance with the detected user's eye (21) pupil position, the processor circuitry (20) delivers signals to said light source array (28) such that one light source (11) is selectively activated at one time and said SLM (13) which is driven such that a new computer-generated hologram is uploaded.

In a further aspect of the present system, said device (10) is a full-color display device and said light source (11) generates coherent light waves of different wavelengths in a time sequential manner.

In a further aspect of the present system, said optical filter (15) is a spatial filter (151) located after the SLM (13) to filter out undesired beams (141) before they reach the exit pupil plane (17).

In a further aspect of the present system, said optical filter (15) is a binary liquid crystal shutter where the open window is selected using input from the head tracking system (19).

In a further aspect of the present system, said optical filter (15) is placed on an intermediate image plane (32) formed between the user's eye (21) and the spatial light modulator (13).

In a further aspect of the present system, said optical filter (15) is an angular selective filter such as HOE, prism, or diffraction grating, located after the SLM (13) to filter out undesired beams (141) before they reach the exit pupil plane (17).

In a further aspect of the present system, said SLM (13) data is a function of head tracking data, pupil tracking data and data from vehicle's sensors.

In a further aspect, present system is produced to be installed in a vehicle during manufacturing.

In a further aspect, present system is produced to be embedded in the vehicle.

In a further aspect of the present system, holographic head-up display system comprise processor circuitry (20) and a peripheral display (29) on or near the windscreen (101) surrounding a central display (30) region provided by at least one light modules (12).

In a further aspect, holographic head-up display system further comprises a peripheral display (29) region surrounding a central vision (28) region.

In a further aspect, peripheral display (29) regions provide a predetermined resolution vision and said peripheral vision is darkened in the central vision (30) region of said foveated display (31).

In a further aspect, said peripheral display (29) display is partially transparent screen wherein the image is formed using projection optics.

In a further embodiment of the present system, said SLM is an array of several spatial light modulators that are tiled using various optical components. Such tiling can be used to increase horizontal or vertical FOV and/or the exit pupil (16) size of the HUD.

In a further embodiment of the present system, optical steering apparatus (18) comprise at least one light source

(11) in a light source array (28) that is actuated according to the input from the head tracking system (19).

In a further embodiment of the present system, head tracking system (19) can compute head motion, location of the user's eyes (21), center location and size of the user's eye (21) pupils, interpupillary distance (24). Calibration of the head-tracking system can be performed continuously or sporadically using the location of the tracking spot (27) that appear on the face of the user.

In a further embodiment of the present system, a second display system can be added to increase the field-of-view and to provide peripheral display (29). Peripheral display (29) would surround the holographic HUD (10), which provides central vision (30). Such a combined display system can be referred to as foveated display (31) system where the holographic HUD (10) is steerable using some optical steering apparatus (18) across the FOV.

In a further embodiment of the present system, SLM (13) can display regular amplitude modulated non-holographic image information. The optical system described can still be used and the desired image can be viewed through the 0th order optical beam. Steering mirror (23) mechanism can still be used to steer the exit pupil (16).

In a further embodiment of the present system, SLM (13) can be programmed to increase the brightness of signal bearing sections of the HUD (10) content. The brightness increase is more pronounced when the content is mostly sparse.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In some examples, each unit, subunit, and/or module of the system may include a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The invention claimed is:

1. A head-up display system comprising:
   at least one light module, each at least one light module comprising at least one light source, and at least one spatial light modulator configured to display computer generated holograms to spatially modulate light incident from said at least one light source;
   wherein said at least one light module is configured to generate a modulated beam that carries holographic image information and undesired beams; and
   an optical filter, the optical filter configured to block said undesired beams and transmit the modulated beam, wherein the modulated beam transmitted through the optical filter forms at least one exit pupil on an exit pupil plane for viewing the head-up display content;
   wherein the at least one exit pupil created by each of the at least one light module is steerable across the exit pupil plane using an optical steering system to direct the modulated beam, said optical steering system comprising a rotatable steering mirror,
   wherein the head up display system comprises an imaging lens, and said exit pupil is formed using the imaging lens, and
   wherein the exit pupil comprises two exit pupils formed by the imaging lens, the two exit pupils being separated by an interpupillary distance (IPD) value in the range of 52 mm to 75 mm.

2. The head-up display system as set forth in claim 1, wherein said optical steering system comprises an actuator comprising an electromagnetic (EM) actuated motor, a gimbal motor, a step motor or a 2-axis actuator.

3. The head-up display system as set forth in claim 1, further comprising an additional actuator configured to move the at least one exit pupil in the exit pupil plane to compensate for a head movement of a user.

4. The head-up display system as set forth in claim 1, wherein said imaging lens comprises at least one surface with optical power consisting of a reflective lens, a diffractive lens, a refractive lens, a freeform optical element, a holographic optical element, or a combination thereof.

5. The head-up display system as set forth in claim 1, wherein said exit pupil is an optical conjugate of the at least one spatial light modulator.

6. The head-up display system as set forth in claim 1, further comprising processor circuitry configured to adjust said interpupillary distance (IPD) based on said computer generate holograms.

7. The head-up display system as set forth in claim 6, wherein said computer-generated holograms displayed by said spatial light monitor are computed by the processor circuitry such that the exit pupil formed at the exit pupil plane is adjusted according to an interpupillary distance of a user.

8. The head-up display system as set forth in claim 1, further comprising processing circuitry configured to perform an aberration correction of the at least one exit pupil.

9. The head-up display system as set forth in claim 1, wherein said rotatable steering mirror is configured to direct the desired modulated beam in the direction of the windscreen of a vehicle.

10. The head-up display system as set forth in claim 1, wherein a field-of-view provided by each of the two exit pupils is configured for alignment with two eyes of a user to provide full binocular overlap at the imaging lens or the steering mirror.

11. The head-up display system as set forth in claim 1, wherein said spatial light modulator is configured to simultaneously generate holographic image content that appear at different depths to a user's eye.

12. The head-up display system as set forth in claim 1, wherein said computer generated hologram comprises multiple virtual image information that appear at different depths to a user's eye.

13. The head-up display system as set forth in claim 1, wherein said spatial light modulator is one of a phase-only device, or a tiled array of spatial light modulators that are combined optically.

14. The head-up display system as set forth in claim 1, wherein said light source is incident on the spatial light modulator using illumination or a waveguide plate, and said light source is an LED, a superluminescent LED, a laser diode or a laser light source coupled to an optical fiber.

15. The head-up display system as set forth in claim 1, further comprising processor circuitry, wherein said computer-generated holograms displayed by said spatial light monitor are computed by the processor circuitry such that the exit pupil formed at the exit pupil plane is shifted according to a position of a pupil center of a user's eye.

16. The head-up display system as set forth in claim 1, further comprising a head tracking system configured to track displacement(s) of a user's head and center positions of a user's eye pupils and a processor circuitry configured to effectuate control of said optical steering system.

17. The head-up display system as set forth in claim 16, wherein said optical steering apparatus comprises at least one light source in a light source array.

18. The head-up display system as set forth in claim 16, wherein the light source module comprises a pointing light source configured to form a tracking spot on a user's face, wherein the coordinates of the tracking spot is detected by the head-tracking system.

19. The head-up display system as set forth in claim 16, wherein, in accordance with a detected user's eye pupil position, the process circuitry is configured to;
   control said at least one light source as a light source array such that one light source is selectively activated at one time, and
   control said spatial light modulator to upload a new computer-generated hologram.

20. The head-up display system as set forth in claim 1, wherein the optical steering system includes a steering mirror configured to adjust at least one of interpupillary distance, exit pupil plane location in the axial direction, or vertical shift of the exit pupils.

21. The head-up display system as set forth in claim 1, wherein said optical filter is an angular selective filter comprising at least one of holographic optical elements, a prism, or diffraction grating located after the spatial light modulator to filter out undesired beams before they reach the exit pupil plane.

22. The head-up display system as set forth in claim 1, wherein said spatial light modulator (SLM) data is a function of head tracking data, pupil tracking data and data from vehicle's sensors.

23. The head-up display system as set forth in claim 1, further comprising processing circuitry configured to compensate for a user head tilt with computer-generated holograms by vertically moving the at least one exit pupil.

24. The head-up display system as set forth in claim 1, wherein the processor circuitry is configured to compensate user head tilt by mechanically moving the at least one light module vertically to change a location of the corresponding exit pupil.

25. The head-up display system as set forth in claim 1, further comprising processor circuitry configured to adjust an aspect ratio of the image by controlling addition of magnifying prism pairs, the magnifying prism pairs added after or within the at least one light module.

* * * * *